(12) United States Patent
Yuza et al.

(10) Patent No.: US 11,215,791 B2
(45) Date of Patent: Jan. 4, 2022

(54) IMAGING LENS

(71) Applicant: TOKYO VISIONARY OPTICS CO., LTD., Tokyo (JP)

(72) Inventors: Shingo Yuza, Sukagawa (JP); Masaya Hashimoto, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 262 days.

(21) Appl. No.: 16/059,529

(22) Filed: Aug. 9, 2018

(65) Prior Publication Data

US 2019/0212532 A1 Jul. 11, 2019

(30) Foreign Application Priority Data

Aug. 9, 2017 (JP) .............................. JP2017-154087

(51) Int. Cl.
| | |
|---|---|
| *G02B 9/62* | (2006.01) |
| *G02B 13/06* | (2006.01) |
| *G02B 7/02* | (2021.01) |
| *G02B 13/00* | (2006.01) |
| *H04N 5/225* | (2006.01) |

(52) U.S. Cl.
CPC .............. *G02B 9/62* (2013.01); *G02B 7/021* (2013.01); *G02B 13/0045* (2013.01); *G02B 13/06* (2013.01); *H04N 5/2254* (2013.01)

(58) Field of Classification Search
USPC ........................................................ 359/761
See application file for complete search history.

(56) References Cited

U.S. PATENT DOCUMENTS

| | | | |
|---|---|---|---|
| 2015/0116573 A1 | 4/2015 | Liao | |
| 2015/0346461 A1 | 12/2015 | Chen et al. | |
| 2015/0350503 A1 | 12/2015 | Chen et al. | |
| 2016/0033745 A1 | 2/2016 | Chen et al. | |
| 2016/0124187 A1* | 5/2016 | Chen ................. | G02B 13/0045 |
| | | | 348/373 |
| 2016/0139367 A1 | 5/2016 | Jung | |
| 2017/0108662 A1* | 4/2017 | Lee ....................... | G02B 5/005 |
| 2017/0153421 A1* | 6/2017 | Baik ..................... | G02B 5/208 |
| 2017/0235109 A1 | 8/2017 | Shin et al. | |

(Continued)

FOREIGN PATENT DOCUMENTS

| | | |
|---|---|---|
| CN | 103777329 A | 5/2014 |
| CN | 104238084 A | 12/2014 |

(Continued)

*Primary Examiner* — Darryl J Collins
(74) *Attorney, Agent, or Firm* — Hamre, Schumann, Mueller & Larson, P.C.

(57) ABSTRACT

An imaging lens includes, in order from an object side to an image side, a first lens being a double-sided aspheric lens, a second lens, a third lens having positive refractive power, a fourth lens, a fifth lens, and a sixth lens being a double-sided aspheric lens and having negative refractive power and a concave surface facing the image side near an optical axis, wherein an image-side surface of said sixth lens is an aspheric surface changing to the convex surface at a peripheral area, and a below conditional expression (1) is satisfied:

$$-0.68 < (N1-1)/(r1 \times f) \times 1000 < 0.68 \qquad (1)$$

where
N1: refractive index at d-ray of the first lens,
r1: paraxial curvature radius of the object-side surface of the first lens, and
f: focal length of an overall optical system.

15 Claims, 13 Drawing Sheets

(56) References Cited

U.S. PATENT DOCUMENTS

2017/0336602 A1    11/2017  Chen et al.
2018/0314039 A1    11/2018  Dai
2018/0356613 A1    12/2018  Chen et al.

FOREIGN PATENT DOCUMENTS

| CN | 104330869 A | 2/2015 |
| CN | 205049802 U | 2/2016 |
| CN | 106054355 A | 10/2016 |
| CN | 104238074 B | 11/2016 |
| CN | 106646835 A | 5/2017 |
| JP | 2015-125405 | 7/2015 |
| JP | 2016-188895 A | 11/2016 |
| JP | 2017-037119 A | 2/2017 |
| TW | 201416703 A | 5/2014 |
| TW | 201527790 A | 7/2015 |
| TW | I620957 B | 4/2018 |

\* cited by examiner

IMAGING LENS

The present application is based on and claims priority of a Japanese patent application No. 2017-154087 filed on Aug. 9, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and high-performance smartphone and mobile phone, an information terminal such as a PDA (Personal Digital Assistant), a game console, PC and a robot, and moreover, a home appliance, a monitoring camera and an automobile with camera function.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and have high-resolution performance. For Example, Patent Document 1 (US2016/0139367A) and Patent Document 2 (JP2015-125405A) disclose the imaging lens comprising six lenses.

Patent Document 1 discloses an imaging lens comprising, in order from an object side, a first lens having a convex surface facing the object side, a second lens having convex surfaces facing the object side and an image side, a third lens having concave surfaces facing the object side and the image side, a fourth lens having the convex surfaces facing the object side and the image side, a fifth lens having the concave surface facing the object side, and a sixth lens having the convex surface facing the object side.

Patent Document 2 discloses an imaging lens comprising, in order from an object side, a first lens having negative refractive power, a second lens, a third lens, a fourth lens, a fifth lens and a sixth lens.

SUMMARY OF THE INVENTION

However, in lens configurations disclosed in the above-described Patent Document 1, when wide field of view and low-profileness are to be realized, it is very difficult to correct aberration at a peripheral area, and excellent optical performance can not be obtained.

In lens configurations disclosed in the above-described Patent Document 2, when the wide field of view, the low-profileness and low F-number are to be realized, it is very difficult to correct aberration at a peripheral area, and excellent optical performance can not be obtained.

The present invention has been made in view of the above-described problems, and an object of the present invention is to provide an imaging lens with high resolution which satisfies in well balance the wide field of view, the low-profileness and the low F-number and excellently corrects aberrations.

Regarding terms used in the present invention, a convex surface, a concave surface or a plane surface of lens surfaces implies that a shape of the lens surface near an optical axis (paraxial portion), and refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object to an image plane, when thickness of an IR cut filter or a cover glass which may be arranged between the imaging lens and the image plane is regarded as an air.

An imaging lens according to the present invention forms an image of an object on a solid-state image sensor, and comprises in order from an object side to an image side, a first lens being a double-sided aspheric lens, a second lens, a third lens having positive refractive power, a fourth lens, a fifth lens, and a sixth lens being a double-sided aspheric lens and having negative refractive power and a concave surface facing the image side near the optical axis, wherein the image-side surface of the sixth lens is an aspheric surface changing to the convex surface at a peripheral area.

In the above-described configuration, the first lens achieves the wide field of view of the imaging lens. Furthermore, the first lens is the double-sided aspheric lens, therefore high-order aberrations are properly corrected. The second lens achieves the wide field of view and corrects astigmatism and coma aberration. The third lens maintains low-profileness and corrects chromatic aberration and spherical aberration. The fourth lens corrects the coma aberration and distortion. The fifth lens corrects the astigmatism and field curvature. The sixth lens maintains the low-profileness and secures back focus. The image-side surface of the sixth lens is the aspheric surface which has the concave surface facing the image side near the optical axis and changes to the convex surface at a peripheral area, therefore, the sixth lens is capable of correcting the field curvature and the distortion and controlling the light ray incident angle to the image sensor.

According to the imaging lens having the above-described configuration, it is preferable that a below conditional expression (1) is satisfied:

$$-0.68 < (N1-1)/(r1 \times f) \times 1000 < 0.68 \qquad (1)$$

where

N1: refractive index at d-ray of the first lens, r1: paraxial curvature radius of the object-side surface of the first lens, and f: focal length of an overall optical system.

The conditional expression (1) defines an appropriate scope of the refractive power of the object-side surface of the first lens, is a condition for reducing sensitivity to manufacturing error of the first lens and properly correcting the aberrations. By satisfying the conditional expression (1), the refractive power of the object-side surface of the first lens becomes appropriate, and the spherical aberration occurred at the first lens can be effectively suppressed and the sensitivity to manufacturing error is reduced.

According to the imaging lens having the above-described configuration, it is preferable that the first lens has negative refractive power.

When the first lens has the negative refractive power, the wide field of view can be easily achieved.

According to the imaging lens having the above-described configuration, it is preferable that the image-side surface of the first lens is the concave surface facing the image side near the optical axis.

When the image-side surface of the first lens is concave surface facing the image side near the optical axis, the spherical aberration and the coma aberration are properly corrected.

According to the imaging lens having the above-described configuration, it is preferable that the object-side surface of the first lens is the aspheric surface changing to the convex surface at a peripheral area.

When a shape of the object-side surface of the first lens is convex at the peripheral area, the light ray to the peripheral area of the first lens is entered at an angle near a normal line of the lens surface. Therefore, high-order aberrations are properly corrected.

According to the imaging lens having the above-described configuration, it is preferable that the image-side surface of the second lens is the concave surface facing the image side near the optical axis.

When the image-side surface of the second lens is concave surface facing the image side near the optical axis, the field curvature and the chromatic aberration are properly corrected.

According to the imaging lens having the above-described configuration, it is preferable that the image-side surface of the third lens is the convex surface facing the image side near the optical axis.

When the image-side surface of the third lens is convex surface facing the image side near the optical axis, the light ray incident angle to the image-side surface of the third lens is appropriately controlled and the chromatic aberration and the spherical aberration are properly corrected.

According to the imaging lens having the above-described configuration, it is preferable that the fourth lens has a meniscus shape having the convex surface facing the object side near the optical axis.

When the fourth lens has the meniscus shape having the convex surface facing the object side near the optical axis, axial chromatic aberration, and high-order spherical aberration, coma aberration and field curvature are properly corrected.

According to the imaging lens having the above-described configuration, it is preferable that the fifth lens has positive refractive power.

When the fifth lens has the positive refractive power, the low-profileness is easily achieved.

According to the imaging lens having the above-described configuration, it is preferable that the fifth lens has the meniscus shape having the concave surface facing the object side near the optical axis.

When the fifth lens has the meniscus shape having the concave surface facing the object side near the optical axis, the light ray incident angle to the fifth lens is appropriately controlled and the astigmatism and the field curvature which are increased according to the wide field of view are properly corrected.

According to the imaging lens having the above-described configuration, it is preferable that the object-side surface of the sixth lens is the convex surface facing the object side near the optical axis, and also an aspheric surface having an off-axial pole point.

When the object-side surface of the sixth lens is the convex surface facing the object side near the optical axis, namely the sixth lens has the meniscus shape near the optical axis, back focus is easily secured. Furthermore, when the object-side surface of the sixth lens has the off-axial pole point, the field curvature and the distortion are properly corrected.

According to the imaging lens having the above-described configuration, it is preferable that a below conditional expression (2) is satisfied:

$$0.25 < vd1/(vd2+vd3) < 1.10 \quad (2)$$

where
vd1: abbe number at d-ray of a first lens,
vd2: abbe number at d-ray of a second lens, and
vd3: abbe number at d-ray of a third lens.

The conditional expression (2) defines relationship between the abbe numbers at d-ray of the first lens, the second lens and the third lens, and is a condition for properly correcting axial chromatic aberration. By satisfying the conditional expression (2), the axial chromatic aberration is properly corrected.

According to the imaging lens of the above-described configuration, it is preferable that a below conditional expression (3) is satisfied:

$$1.3 < vd5/vd6 < 4.1 \quad (3)$$

where
vd5: abbe number at d-ray of a fifth lens, and
vd6: abbe number at d-ray of a sixth lens.

The conditional expression (3) defines relationship between the abbe numbers at d-ray of the fifth lens and the sixth lens, and is a condition for properly correcting chromatic aberration of magnification. By satisfying the conditional expression (3), the chromatic aberration of magnification is properly corrected.

According to the imaging lens of the above-described configuration, it is preferable that a below conditional expression (4) is satisfied:

$$-18 < f1/f < -2 \quad (4)$$

where
f1: focal length of the first lens, and
f: focal length of the overall optical system.

The conditional expression (4) defines the refractive power of the first lens, and is a condition for achieving the low-profileness and the wide field of view. When a value is below the upper limit of the conditional expression (4), the negative refractive power of the first lens becomes appropriate, and the low-profileness is achieved. On the other hand, when the value is above the lower limit of the conditional expression (4), the wide field of view is achieved.

According to the imaging lens having the above-described configuration, it is preferable that a below conditional expression (5) is satisfied:

$$1.8 < |f2|/f \quad (5)$$

where
f2: focal length of the second lens, and
f: focal length of the overall optical system.

The conditional expression (5) defines the refractive power of the second lens, and is a condition for achieving the low-profileness and the proper aberration correction. When the value is above the lower limit of the conditional expression (5), the chromatic aberration is corrected, a total track length is shortened and the field curvature is properly corrected.

According to the imaging lens having the above-described configuration, it is preferable that composite refractive power of the first lens and the second lens is negative, and moreover, a below conditional expression (6) is satisfied:

$$-24.0 < f12/f < -0.8 \quad (6)$$

where f12: composite focal length of the first lens and the second lens, and f: focal length of the overall optical system of the imaging lens.

When the composite refractive power of the first lens and the second lens is negative, the wide field of view is more easily achieved. The conditional expression (6) defines the composite focal length of the first lens and the second lens, and is a condition for achieving the low-profileness and the proper aberration correction. When a value is below the upper limit of the conditional expression (6), the negative composite refractive power of the first lens and the second lens becomes appropriate, and correction of the spherical aberration and the astigmatism becomes facilitated. Furthermore, the low-profileness can be also achieved. On the other hand, when the value is above the lower limit of the conditional expression (6), the wide field of view can be realized.

According to the imaging lens of the above-described configuration, it is preferable that a below conditional expression (7) is satisfied:

$$0.5 < f3/f < 1.9 \qquad (7)$$

where f3: focal length of the third lens, and f: focal length of the overall optical system.

The conditional expression (7) defines the refractive power of the third lens, and is a condition for achieving the low-profileness and the proper aberration correction. When a value is below the upper limit of the conditional expression (7), the positive refractive power of the third lens becomes appropriate, and the low-profileness is achieved. On the other hand, when the value is above the lower limit of the conditional expression (7), the spherical aberration and the coma aberration are properly corrected.

According to the imaging lens having the above-described configuration, it is preferable that a below conditional expression (8) is satisfied:

$$1.9 < |f4|/f \qquad (8)$$

where f4: focal length of the fourth lens, and f: focal length of the overall optical system.

The conditional expression (8) defines the refractive power of the fourth lens, and is a condition for achieving the low-profileness and the proper aberration correction. When the value is above the lower limit of the conditional expression (8), the chromatic aberration is corrected, a total track length is shortened and the field curvature is properly corrected.

According to the imaging lens of the above-described configuration, it is preferable that a below conditional expression (9) is satisfied:

$$0.35 < f5/f < 1.20 \qquad (9)$$

where f5: focal length of the fifth lens, and f: focal length of the overall optical system.

The conditional expression (9) defines the refractive power of the fifth lens, and is a condition for achieving the low-profileness and the proper aberration correction. When a value is below the upper limit of the conditional expression (9), the positive refractive power of the fifth lens becomes appropriate, and the low-profileness is achieved. On the other hand, when the value is above the lower limit of the conditional expression (9), the field curvature and the distortion are properly corrected.

According to the imaging lens of the above-described configuration, it is preferable that a below conditional expression (10) is satisfied:

$$-1.45 < f6/f < -0.35 \qquad (10)$$

where f6: focal length of the sixth lens, and f: focal length of the overall optical system.

The conditional expression (10) defines the refractive power of the sixth lens, and is a condition for securing the low-profileness and the back focus. When a value is below the upper limit of the conditional expression (10), the negative refractive power of the sixth lens is prevented from being excessively large. As a result, the low-profileness is maintained. On the other hand, when the value is above the lower limit of the conditional expression (10), the negative refractive power of the sixth lens is prevented from being excessively small. As a result, the back focus is appropriately secured.

According to the imaging lens having the above-described configuration, it is preferable that a below conditional expression (11) is satisfied:

$$0.1 < r12/f < 0.5 \qquad (11)$$

where r12: paraxial curvature radius of the image-side surface of the sixth lens, and f: focal length of the overall optical system of the imaging lens.

The conditional expression (11) defines a shape near the optical axis of the image-side surface of the sixth lens, and is a condition for securing the back focus and achieving the low-profileness. By satisfying the conditional expression (11), the appropriate back focus is secured and the low-profileness can be achieved.

According to the imaging lens having the above-described configuration, it is preferable that a below conditional expression (12) is satisfied:

$$Fno \leq 2.4 \qquad (12)$$

where

Fno: F-number.

The conditional expression (12) defines the F-number. When a value is below the upper limit of the conditional expression (12), brightness required for the imaging lens in recent years can be fully secured, when it is mounted in a portable mobile device, a digital camera, a monitoring camera, or an onboard camera.

According to the imaging lens having the above-described configuration, it is preferable that a below conditional expression (13) is satisfied:

$$2 < (D2/TTL) \times 100 < 8 \qquad (13)$$

where

D2: thickness along the optical axis of the second lens, and

TTL: distance along the optical axis from an object-side surface of the first lens to an image plane.

The conditional expression (13) defines an appropriate thickness along the optical axis of the second lens, and is a condition for maintaining proper formability of the second lens and achieving the low-profileness. When a value is below the upper limit of the conditional expression (13), the thickness along the optical axis of the second lens is prevented from being excessively large, and securing an air gap of the object side and the image side of the second lens is facilitated. Therefore, the low-profileness can be maintained. On the other hand, when the value is above the lower limit of the conditional expression (13), the thickness along the optical axis of the second lens is prevented from being excessively small, and the formability of the lens becomes proper.

According to the imaging lens having the above-described configuration, it is preferable that a below conditional expression (14) is satisfied:

$$0.1 < (T5/TTL) \times 100 < 1.3 \qquad (14)$$

where

T5: distance along an optical axis from an image-side surface of the fifth lens to an object-side surface of the sixth lens, and TTL: distance along the optical axis from an object-side surface of the first lens to an image plane.

The conditional expression (14) defines a distance along an optical axis from the image-side surface of the fifth lens to the object-side surface of the sixth lens, and is a condition for properly correcting the aberration correction. By satisfying the conditional expression (14), the total track length is shortened and the coma aberration, the field curvature and the distortion are properly corrected.

Effect of Invention

According to the present invention, there can be provided an imaging lens with high resolution which satisfies in well balance the wide field of view, the low-profileness and the low F-number, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13, 15, 17 and 19 are schematic views of the imaging lenses in Examples 1 to 10 according to the embodiments of the present invention, respectively.

Figure 1:
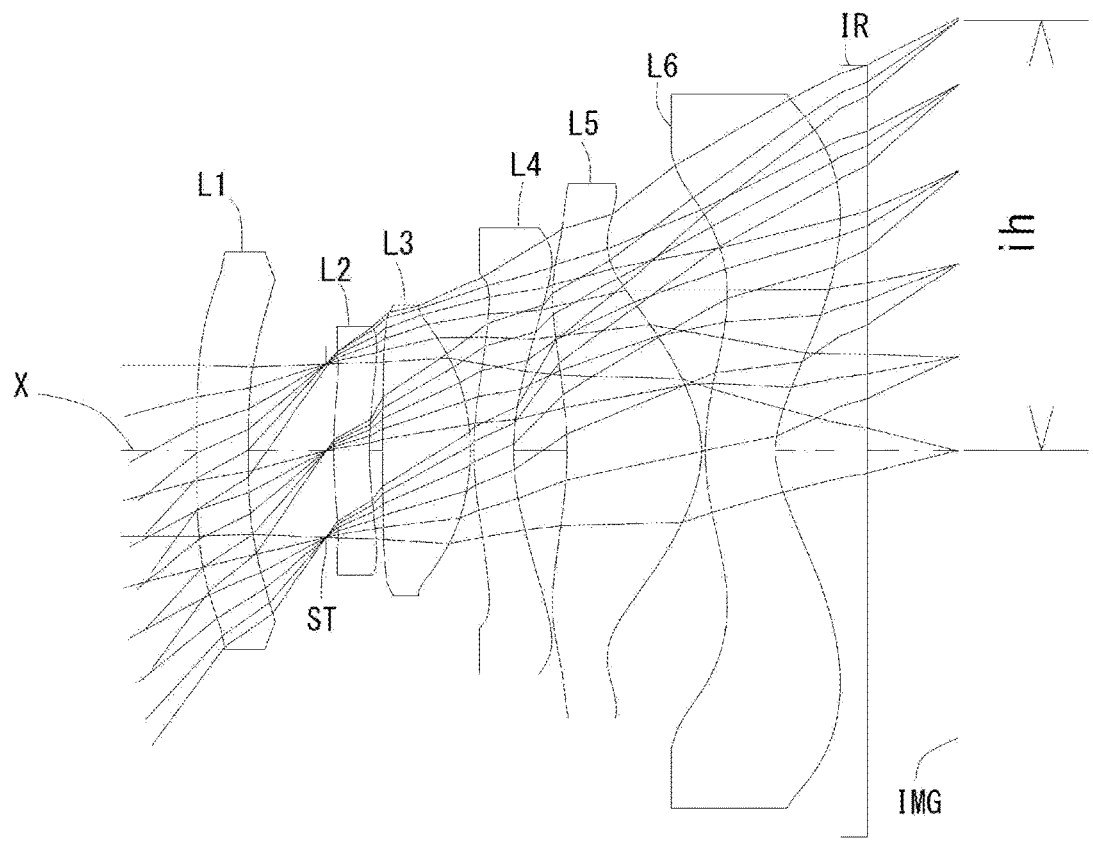
FIG. 1 is a schematic view showing a general configuration of an imaging lens in Example 1 according to the present invention.

As shown in FIG. 1, the imaging lens according to the present embodiments comprises in order from an object side to an image side, a first lens L1 being a double-sided aspheric lens, a second lens L2, a third lens L3 having positive refractive power, a fourth lens L4, a fifth lens L5, and a sixth lens L6 being a double-sided aspheric lens and having negative refractive power and a concave surface facing the image side near the optical axis, wherein the image-side surface of the sixth lens L6 is an aspheric surface changing to the convex surface at a peripheral area.

A filter IR such as an IR cut filter and a cover glass are arranged between the sixth lens L6 and an image plane IMG. The filter IR is omissible.

The first lens L1 achieves the wide field of view of the imaging lens while suppressing occurrence of aberrations at the double-sided aspheric surfaces. The first lens L1 has a plane object-side surface near the optical axis and a concave image-side surface near the optical axis. Thus configured, the light ray wide incident is made to be near to parallel to the optical axis, and enters to the second lens L2. The shape of the object-side surface of the first lens L1 is not limited to the plane surface near the optical axis, and various options are available within a condition for maintaining an effect of the incident to the second lens L2 at the appropriate light ray incident angle. In Examples 7 and 9 shown in FIGS. 13 and 17, the object-side surface of the first lens L1 has the convex surface near the optical axis X, and in Examples 8 and 10¥ shown in FIGS. 15 and 19, the object-side surface of the first lens L1 has the concave surface near the optical axis X.

The aspheric surface of the object-side surface of the first lens L1 changes to the convex surface at a peripheral area.

Thus configured, the light ray incident to the peripheral area is entered at an angle near a normal line of the lens surface. Therefore, occurrence of the high-order aberrations is suppressed.

The second lens L2 has the negative refractive power, and suppresses the light ray incident angle to the third lens L3 to be small and properly corrects aberration balance between a center and a peripheral area. The refractive power of the second lens L2 may be positive as shown in an Example 5 shown in FIG. 9. In this case, more low-profileness is achieved. A shape of the second lens L2 is a meniscus shape having the concave surface facing the image side near the optical axis X, therefore the astigmatism and the coma aberration are properly corrected, and the wide field of view of the imaging lens is achieved. As described in an Example 7 shown in FIG. 13, the second lens L2 may have a biconcave shape having the concave surfaces facing the object side and the image side near the optical axis X. In this case, more wide field of view is achieved.

In the imaging lens according to the present invention, an aperture stop ST is arranged between the first lens L1 and the second lens L2. Therefore, correction of aberrations and control of the light ray incident angle of high image height to the image sensor becomes facilitated.

The third lens L3 has a biconvex shape having the convex surfaces facing the object side and the image side near the optical axis X, and has the positive refractive power. Thus configured, the low-profileness is achieved. Since the lens having main positive refractive power is arranged near the center of the optical system, the aberrations of all over the optical system is easily balanced. The shape of the third lens L3 may be the meniscus shape having the concave surface facing the object side near the optical axis X. In this case, the light ray incident angle to the third lens L3 is appropriately controlled and the chromatic aberration and the astigmatism are properly corrected.

The fourth lens L4 has the negative refractive power, and properly corrects the coma aberration and the distortion. The refractive power of the fourth lens L4 may be positive as described in an Example 6 shown in FIG. 11. In this case, more low-profileness is achieved. The shape of the fourth lens L4 is the meniscus shape having the convex surface facing the object side near the optical axis X, and the axial chromatic aberration, and high-order spherical aberration, coma aberration and field curvature are properly corrected.

The fifth lens L5 has the positive refractive power, and properly corrects the astigmatism and the field curvature. The shape of the fifth lens L5 is the meniscus shape having the concave surface facing the object side near the optical axis X, and the light ray incident angle to the fifth lens L5 is appropriately controlled and the astigmatism and the field curvature which are increased according to the wide field of view are properly corrected.

The sixth lens L6 is a double-sided aspheric lens having the negative refractive power and the meniscus shape having the concave surface facing the image side near the optical axis X, and secures back focus while maintaining the low-profileness. The aspheric image-side surface is concave surface facing the image side near the optical axis X, and changes to the convex surface facing the image side at the peripheral area. Therefore, the correction of the field curvature and the distortion, and the control of the light ray incident angle to the image sensor are properly made. The object-side surface of the sixth lens L6 is the convex surface facing the object side near the optical axis X, and is the aspheric surface having an off-axial pole point. Thus, the field curvature and the distortion are properly corrected.

Regarding the imaging lens according to the present embodiments, for example as shown in FIG. 1, all lenses of the first lens L1 to the sixth lens L6 are preferably single lenses which are not cemented each other. Configuration without the cemented lens can frequently use the aspheric surfaces, and proper correction of the aberrations can be realized. Furthermore, workload for cementing is reduced, and manufacturing in low cost becomes possible.

Regarding the imaging lens according to the present embodiments, a plastic material is used for all of the lenses, and manufacturing is facilitated and mass production in a low cost can be realized. Both-side surfaces of all lenses are appropriate aspheric, and the aberrations are favorably corrected.

The material applied to the lens is not limited to the plastic material. By using glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (14).

$$-0.68 < (N1-1)/(r1 \times f) \times 1000 < 0.68 \quad (1)$$

$$0.25 < vd1/(vd2+vd3) < 1.10 \quad (2)$$

$$1.3 < vd5/vd6 < 4.1 \quad (3)$$

$$-18 < f1/f < -2 \quad (4)$$

$$1.8 < |f2|/f \quad (5)$$

$$-24.0 < f12/f < -0.8 \quad (6)$$

$$0.5 < f3/f < 1.9 \quad (7)$$

$$1.9 < |f4|/f \quad (8)$$

$$0.35 < f5/f < 1.20 \quad (9)$$

$$-1.45 < f6/f < -0.35 \quad (10)$$

$$0.1 < r12/f < 0.5 \quad (11)$$

$$Fno \leq 2.4 \quad (12)$$

$$2 < (D2/TTL) \times 100 < 8 \quad (13)$$

$$0.1 < (T5/TTL) \times 100 < 1.3 \quad (14)$$

where

N1: refractive index at d-ray of the first lens L1,
vd1: abbe number at d-ray of a first lens L1,
vd2: abbe number at d-ray of a second lens L2,
vd3: abbe number at d-ray of a third lens L3,
vd5: abbe number at d-ray of a fifth lens L5,
vd6: abbe number at d-ray of a sixth lens L6,
T5: distance along an optical axis from an image-side surface of the fifth lens L5 to an object-side surface of the sixth lens L6,
TTL: distance along the optical axis X from an object-side surface of the first lens L1 to an image plane IMG,
f: focal length of an overall optical system,
f1: focal length of the first lens L1, f2: focal length of the second lens L2,
f3: focal length of the third lens L3,
f4: focal length of the fourth lens L4,
f5: focal length of the fifth lens L5,
f6: focal length of the sixth lens L6,
f12: composite focal length of the first lens L1 and the second lens L2,
D2: thickness along the optical axis X of the second lens L2,
r1: paraxial curvature radius of the object-side surface of the first lens L1,
r12: paraxial curvature radius of the image-side surface of the sixth lens L6, and
Fno: F-number.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (14a).

$$-0.62 < (N1-1)/(r1 \times f) \times 1000 < 0.62 \quad (1a)$$

$$0.35 < vd1/(vd2+vd3) < 0.95 \quad (2a)$$

$$2.0 < vd5/vd6 < 3.4 \quad (3a)$$

$$-15.0 < f1/f < -2.6 \quad (4a)$$

$$2.8 < |f2|/f \quad (5a)$$

$$-20.0 < f12/f < -1.3 \quad (6a)$$

$$0.75 < f3/f < 1.55 \quad (7a)$$

$$3.0 < |f4|/f \quad (8a)$$

$$0.55 < f5/f < 1.00 \quad (9a)$$

$$-1.20 < f6/f < -0.60 \quad (10a)$$

$$0.2 < r12/f < 0.4 \quad (11a)$$

$$Fno \leq 2.2 \quad (12a)$$

$$3.0 < (D2/TTL) \times 100 < 6.5 \quad (13a)$$

$$0.2 < (T5/TTL) \times 100 < 1.1 \quad (14a)$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{02} \quad \text{Equation 1}$$

Next, examples of the imaging lens according to this embodiment will be explained. In each example, f denotes the focal length of the overall optical system of the imaging lens, Fno denotes an F-number, ω denotes a half field of view, and ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

TABLE 1

Example 1
Unit mm

| f = 2.75 | ih = 3.74 |
| Fno = 2.0 | TTL = 5.92 |
| ω (°) = 57.5 | |

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4000 | 1.535 | 55.66 (vd1) |
| 2* | 15.0295 | 0.6200 | | |
| 3 (Stop) | Infinity | 0.0590 | | |
| 4* | 4.1861 | 0.2800 | 1.661 | 20.37 (vd2) |
| 5* | 3.4346 | 0.1030 | | |
| 6* | 12.3073 | 0.6890 | 1.535 | 55.66 (vd3) |
| 7* | −1.8440 | 0.0300 | | |
| 8* | 2.6760 | 0.3100 | 1.661 | 20.37 (vd4) |
| 9* | 1.9727 | 0.4210 | | |
| 10* | −2.9524 | 1.0600 | 1.535 | 55.66 (vd5) |
| 11* | −0.9021 | 0.0300 | | |
| 12* | 1.9234 | 0.5530 | 1.661 | 20.37 (vd6) |
| 13* | 0.7731 | 0.6000 | | |

TABLE 1-continued

Example 1
Unit mm

| | | | | | |
|---|---|---|---|---|---|
| 14 | Infinity | 0.2100 | 1.517 | 64.20 | |
| 15 | Infinity | 0.6298 | | | |
| Image Plane | Infinity | | | | |

Constituent Lens Data

| Lens | Start Surface | Focal Length | | Composite Focal Length | |
|---|---|---|---|---|---|
| 1 | 1 | −28.103 | f12 | −14.955 | |
| 2 | 4 | −33.994 | | | |
| 3 | 6 | 3.050 | | | |
| 4 | 8 | −13.776 | | | |
| 5 | 10 | 2.058 | | | |
| 6 | 12 | −2.419 | | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 2.568422E−02 |
| A4 | 8.357370E−02 | 1.237257E−01 | −4.935495E−02 | −4.464272E−02 | −2.150324E−02 | −5.387642E−02 |
| A6 | −2.594671E−02 | −2.598836E−02 | −1.998386E−01 | −9.128122E−02 | −8.573483E−02 | 2.211722E−03 |
| A8 | 4.489945E−03 | −8.133517E−02 | 8.943075E−01 | −3.860778E−02 | 2.703039E−02 | 2.179378E−02 |
| A10 | 1.913308E−03 | 1.554642E−01 | −3.079636E+00 | 4.850201E−01 | 1.713309E−01 | −5.506861E−02 |
| A12 | −1.440696E−03 | −1.316414E−01 | 4.915424E+00 | −1.099943E+00 | −1.484078E−01 | 3.295247E−02 |
| A14 | 1.501645E−04 | 4.922765E−02 | −3.187398E+00 | 1.065826E+00 | 4.029486E−02 | 7.446718E−02 |
| A16 | 0.000000E+00 | −6.708911E−03 | 0.000000E+00 | −4.104995E−01 | 0.000000E+00 | −1.093188E−01 |
| A18 | 0.000000E+00 | 0.000000E+00 | 0.000000E+00 | 0.000000E+00 | 0.000000E+00 | 4.588210E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.369252E+00 | −4.386554E−01 | −4.402879E+00 |
| A4 | −9.561561E−02 | −5.987173E−02 | 1.138308E−01 | −2.355269E−02 | −1.396888E−01 | −2.540104E−02 |
| A6 | −2.667437E−02 | −7.594899E−02 | −8.437151E−02 | −6.699828E−02 | 3.639098E−02 | −1.350923E−02 |
| A8 | 5.408076E−02 | 9.030233E−02 | 6.025745E−02 | 1.176135E−01 | −1.836259E−02 | 1.282827E−02 |
| A10 | −2.716293E−02 | −3.901375E−02 | −2.207954E−02 | −1.082057E−01 | 8.503674E−03 | −5.710377E−03 |
| A12 | 2.715590E−02 | −4.326612E−04 | 4.572580E−03 | 6.298271E−02 | −2.670590E−03 | 1.591401E−03 |
| A14 | −3.546566E−02 | 6.399826E−03 | −7.470843E−04 | −2.154825E−02 | 5.334063E−04 | −2.871474E−04 |
| A16 | 1.994145E−02 | −2.245746E−03 | 1.089599E−04 | 4.182313E−03 | −7.199553E−05 | 3.236807E−05 |
| A18 | −4.069766E−03 | 2.541155E−04 | −7.993645E−06 | −4.282891E−04 | 6.925251E−06 | −2.068651E−06 |
| A20 | 0.000000E+00 | 0.000000E+00 | 0.000000E+00 | 1.803475E−05 | −3.559254E−07 | 5.727447E−08 |

The imaging lens in Example 1 satisfies conditional expressions (1) to (14) as shown in Table 11.

Figure 2:
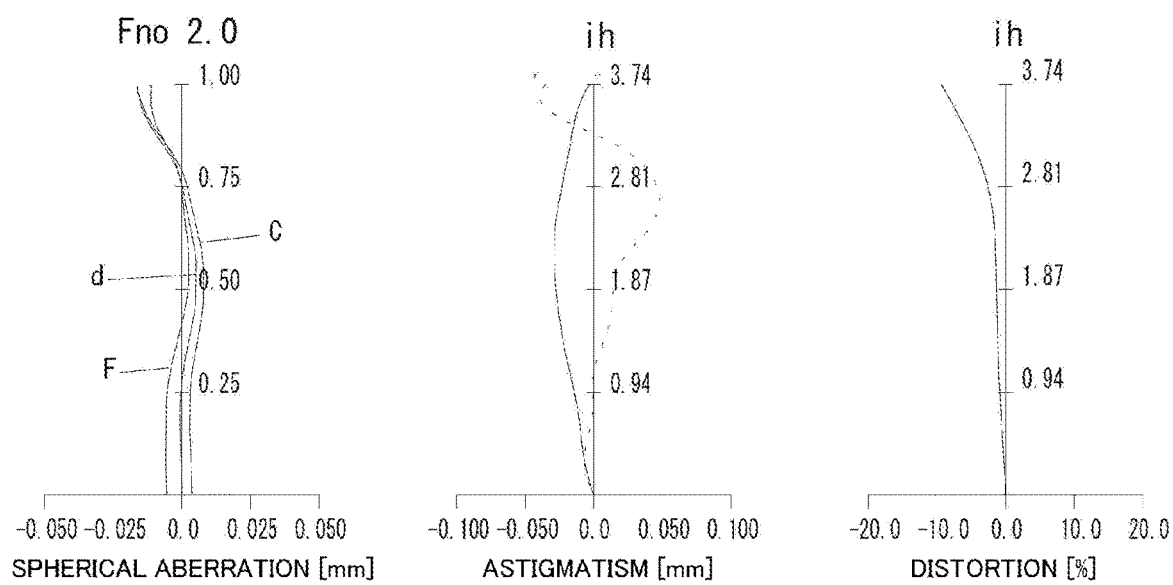
FIG. 2 shows spherical aberration, astigmatism, and distortion of the imaging lens in Example 1 according to the present invention.
Figure 3:
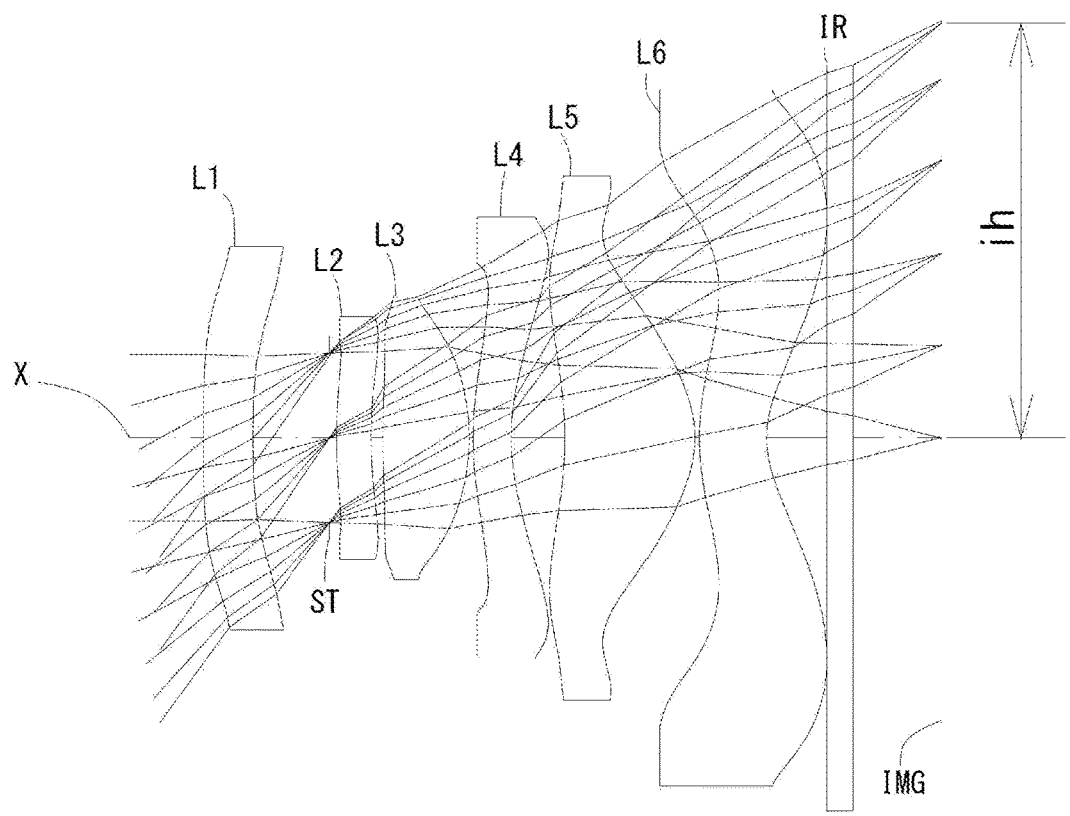
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12, 14, 16, 18 and 20). As shown in FIG. 2, each aberration is corrected excellently.

EXAMPLE 2

The basic lens data is shown below in Table 2.

TABLE 2

Example 2
Unit mm f = 2.75   ih = 3.74
Fno = 2.0   TTL = 5.92
ω (20 ) = 59.1

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4000 | 1.535 | 55.66 (vd1) |
| 2* | 14.0954 | 0.6250 | | |
| 3 (Stop) | Infinity | 0.0580 | | |
| 4* | 4.2868 | 0.2800 | 1.661 | 20.37 (vd2) |
| 5* | 3.4733 | 0.0980 | | |
| 6* | 10.5406 | 0.6970 | 1.535 | 55.66 (vd3) |

TABLE 2-continued

Example 2
Unit mm

| | | | | |
|---|---|---|---|---|
| 7* | −1.8518 | 0.0300 | | |
| 8* | 2.5912 | 0.3110 | 1.661 | 20.37 (vd4) |
| 9* | 1.9662 | 0.4340 | | |
| 10* | −2.7951 | 1.0600 | 1.535 | 55.66 (vd5) |
| 11* | −0.9007 | 0.0350 | | |
| 12* | 1.9396 | 0.5450 | 1.661 | 20.37 (vd6) |
| 13* | 0.7790 | 0.6000 | | |
| 14 | Infinity | 0.2100 | 1.517 | 64.20 |
| 15 | Infinity | 0.6120 | | |
| Image Plane | Infinity | | | |

Constituent Lens Data

| Lens | Start Surface | Focal Length | | Composite Focal Length |
|---|---|---|---|---|
| 1 | 1 | −26.356 | f12 | −14.060 |
| 2 | 4 | −32.095 | | |
| 3 | 6 | 3.004 | | |
| 4 | 8 | −15.382 | | |
| 5 | 10 | 2.079 | | |
| 6 | 12 | −2.423 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 4.313395E−02 |
| A4 | 8.985587E−02 | 1.340451E−01 | −4.317309E−02 | −4.612620E−02 | −2.296816E−02 | −6.955561E−02 |
| A6 | −3.385450E−02 | −4.231559E−02 | −1.973424E−01 | −6.511320E−02 | −6.851421E−02 | 1.187834E−01 |
| A8 | 1.077922E−02 | −5.482154E−02 | 8.597451E−01 | −1.413564E−01 | −3.254293E−02 | −3.190852E−01 |
| A10 | −1.417758E−03 | 1.240017E−01 | −2.914177E+00 | 6.784773E−01 | 2.484332E−01 | 5.698161E−01 |
| A12 | −5.461195E−04 | −1.076838E−01 | 4.662701E+00 | −1.237185E+00 | −1.945914E−01 | −7.301315E−01 |
| A14 | 5.183807E−05 | 3.845643E−02 | −3.047314E+00 | 1.075756E+00 | 5.146519E−02 | 6.765945E−01 |
| A16 | 0.000000E+00 | −4.664680E−03 | 0.000000E+00 | −3.929337E−01 | 0.000000E+00 | −3.944437E−01 |
| A18 | 0.000000E+00 | 0.000000E+00 | 0.000000E+00 | 0.000000E+00 | 0.000000E+00 | 1.074495E−01 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.228204E+00 | −4.383716E−01 | −4.464339E+00 |
| A4 | −1.069933E−01 | −5.473890E−02 | 1.209780E−01 | −1.188040E−03 | −1.457445E−01 | −2.686984E−02 |
| A6 | 4.432611E−02 | −8.419842E−02 | −7.455951E−02 | −1.065916E−01 | 4.264640E−02 | −1.338749E−02 |
| A8 | −1.405046E−01 | 9.761814E−02 | 3.511918E−02 | 1.669677E−01 | −2.798684E−02 | 1.280815E−02 |
| A10 | 2.871650E−01 | −4.189803E−02 | −1.831981E−03 | −1.462131E−01 | 1.633161E−02 | −5.605633E−03 |
| A12 | −2.846567E−01 | −7.128384E−04 | −3.635367E−03 | 8.015944E−02 | −6.580546E−03 | 1.516164E−03 |
| A14 | 1.482152E−01 | 6.866279E−03 | 1.082646E−03 | −2.614912E−02 | 1.701689E−03 | −2.657573E−04 |
| A16 | −3.897361E−02 | −2.339481E−03 | −1.061052E−04 | 4.902850E−03 | −2.697473E−04 | 2.938177E−05 |
| A18 | 3.831072E−03 | 2.580139E−04 | 2.463350E−06 | −4.891953E−04 | 2.435885E−05 | −1.864783E−06 |
| A20 | 0.000000E+00 | 0.000000E+00 | 0.000000E+00 | 2.017241E−05 | −9.799331E−07 | 5.192794E−08 |

The imaging lens in Example 2 satisfies conditional expressions (1) to (14) as shown in Table 11.

Figure 4:
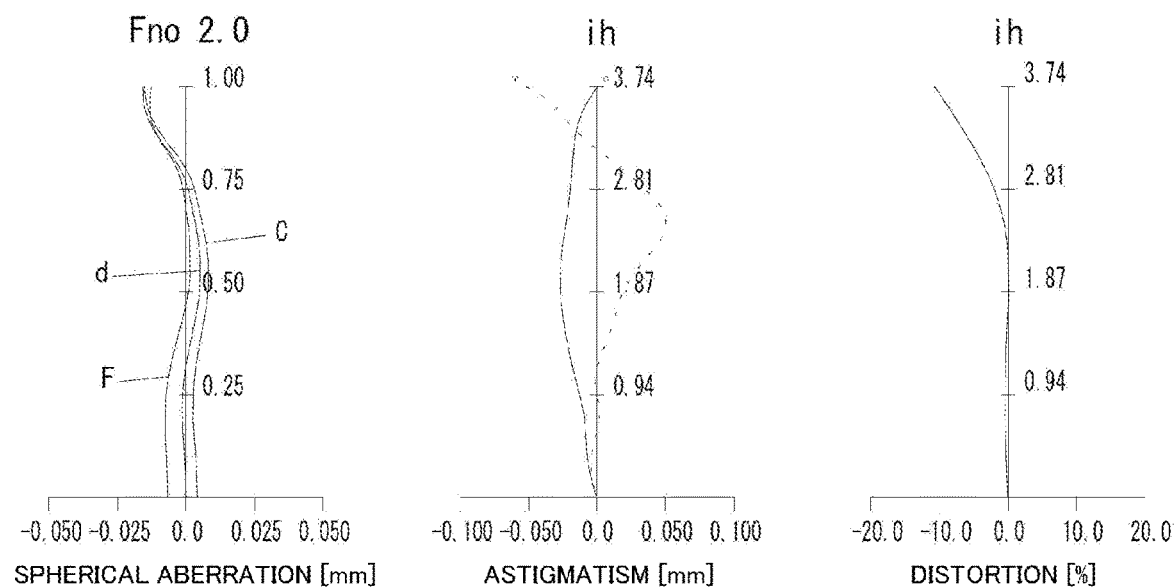
FIG. 4 shows spherical aberration, astigmatism, and distortion of the imaging lens in Example 2 according to the present invention.
Figure 5:
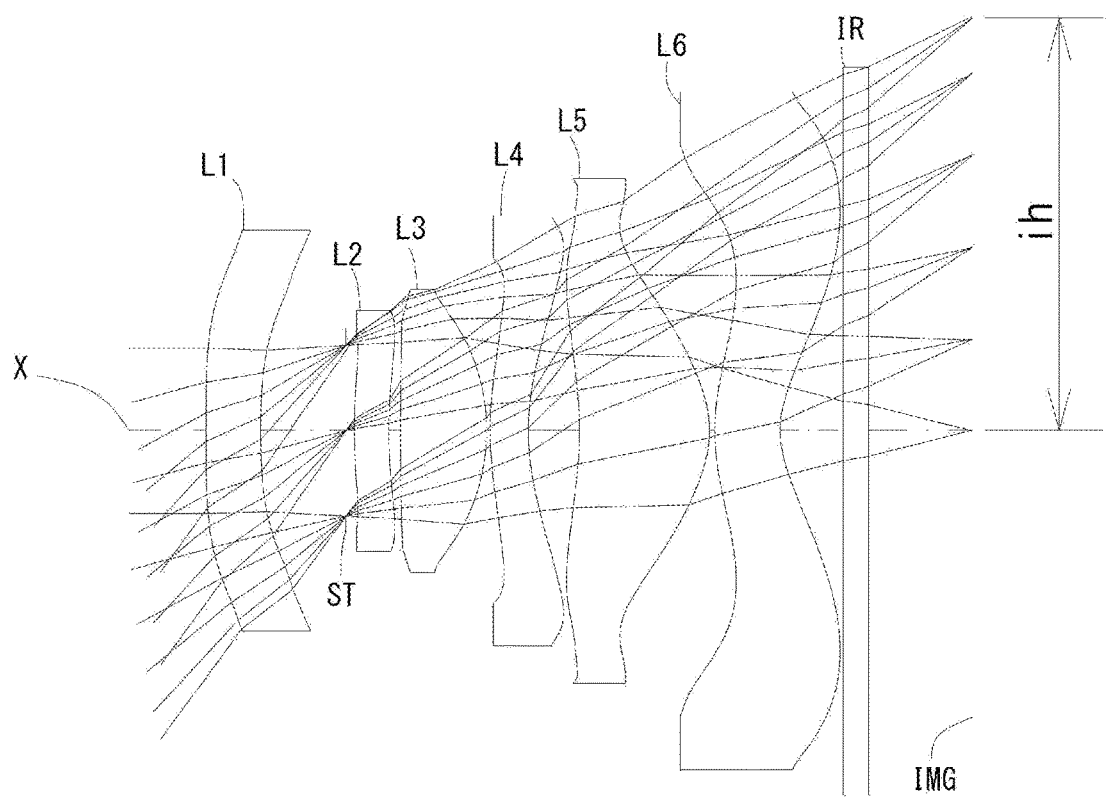
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

EXAMPLE 3

The basic lens data is shown below in Table 3.

TABLE 3

Example 3
Unit mm

| | | |
|---|---|---|
| f = 2.75 | | ih = 3.74 |
| Fno = 2.0 | | TTL = 6.17 |
| ω (°) = 59.8 | | |

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4460 | 1.535 | 55.66 (vd1) |
| 2* | 9.3825 | 0.6980 | | |
| 3 (Stop) | Infinity | 0.0660 | | |

TABLE 3-continued

Example 3
Unit mm

| | | | | |
|---|---|---|---|---|
| 4* | 4.6416 | 0.2800 | 1.661 | 20.37 (vd2) |
| 5* | 3.7125 | 0.0930 | | |
| 6* | 11.8295 | 0.7000 | 1.535 | 55.66 (vd3) |
| 7* | −1.8141 | 0.0300 | | |
| 8* | 2.6939 | 0.3100 | 1.661 | 20.37 (vd4) |
| 9* | 2.0042 | 0.4170 | | |
| 10* | −2.9368 | 1.0600 | 1.535 | 55.66 (vd5) |
| 11* | −0.9226 | 0.0460 | | |
| 12* | 1.9009 | 0.5300 | 1.661 | 20.37 (vd6) |
| 13* | 0.8011 | 0.6000 | | |
| 14 | Infinity | 0.2100 | 1.517 | 64.20 |
| 15 | Infinity | 0.7533 | | |
| Image Plane | Infinity | | | |

Constituent Lens Data

| Lens | Start Surface | Focal Length | | Composite Focal Length |
|---|---|---|---|---|
| 1 | 1 | −17.544 | f12 | −10.937 |
| 2 | 4 | −31.894 | | |
| 3 | 6 | 2.995 | | |
| 4 | 8 | −14.428 | | |
| 5 | 10 | 2.126 | | |
| 6 | 12 | −2.593 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 9.157978E−03 |
| A4 | 9.214298E−02 | 1.380865E−01 | −4.740350E−02 | −5.478252E−02 | −3.015971E−02 | −8.345837E−02 |
| A6 | −3.312408E−02 | −3.141564E−02 | −2.204332E−01 | −5.112062E−02 | −4.870892E−02 | 1.400655E−01 |
| A8 | 1.195351E−02 | −4.993581E−02 | 9.508273E−01 | −1.875040E−01 | −8.599946E−02 | −2.210234E−01 |
| A10 | −2.643306E−03 | 9.607533E−02 | −3.071147E+00 | 7.622837E−01 | 3.679021E−01 | 1.044223E−01 |
| A12 | 2.468751E−04 | −6.819072E−02 | 4.688785E+00 | −1.312145E+00 | −3.056033E−01 | 2.143640E−01 |
| A14 | −7.156963E−05 | 1.557566E−02 | −2.929921E+00 | 1.113440E+00 | 8.473805E−02 | −3.507094E−01 |
| A16 | 0.000000E+00 | −1.027423E−04 | 0.000000E+00 | −4.016943E−01 | 0.000000E+00 | 1.861043E−01 |
| A18 | 0.000000E+00 | 0.000000E+00 | 0.000000E+00 | 0.000000E+00 | 0.000000E+00 | −2.699380E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.543688E+00 | −4.599575E−01 | −4.477877E+00 |
| A4 | −1.265343E−01 | −5.726280E−02 | 1.269416E−01 | −4.242743E−02 | −1.445608E−01 | −2.871384E−02 |
| A6 | 1.008763E−01 | −8.235901E−02 | −6.570460E−02 | −5.258849E−03 | 4.856457E−02 | −8.466771E−03 |
| A8 | −2.825173E−01 | 8.088846E−02 | 2.847780E−02 | 3.070406E−02 | −3.383404E−02 | 8.508272E−03 |
| A10 | 5.454468E−01 | −2.732691E−03 | −1.756445E−02 | −2.447383E−02 | 1.971669E−02 | −3.591999E−03 |
| A12 | −5.586033E−01 | −3.821406E−02 | 1.594151E−02 | 9.187076E−03 | −8.075091E−03 | 9.428475E−04 |
| A14 | 3.128625E−01 | 2.511370E−02 | −7.596585E−03 | −3.987858E−04 | 2.194339E−03 | −1.627357E−04 |
| A16 | −9.172140E−02 | −6.810034E−03 | 1.614010E−03 | −6.448188E−04 | −3.768000E−04 | 1.794189E−05 |
| A18 | 1.086568E−02 | 6.941637E−04 | −1.257695E−04 | 1.585036E−04 | 3.736179E−05 | −1.148124E−06 |
| A20 | 0.000000E+00 | 0.000000E+00 | 0.000000E+00 | −1.135824E−05 | −1.635393E−06 | 3.260287E−08 |

The imaging lens in Example 3 satisfies conditional expressions (1) to (14) as shown in Table 11.

Figure 6:
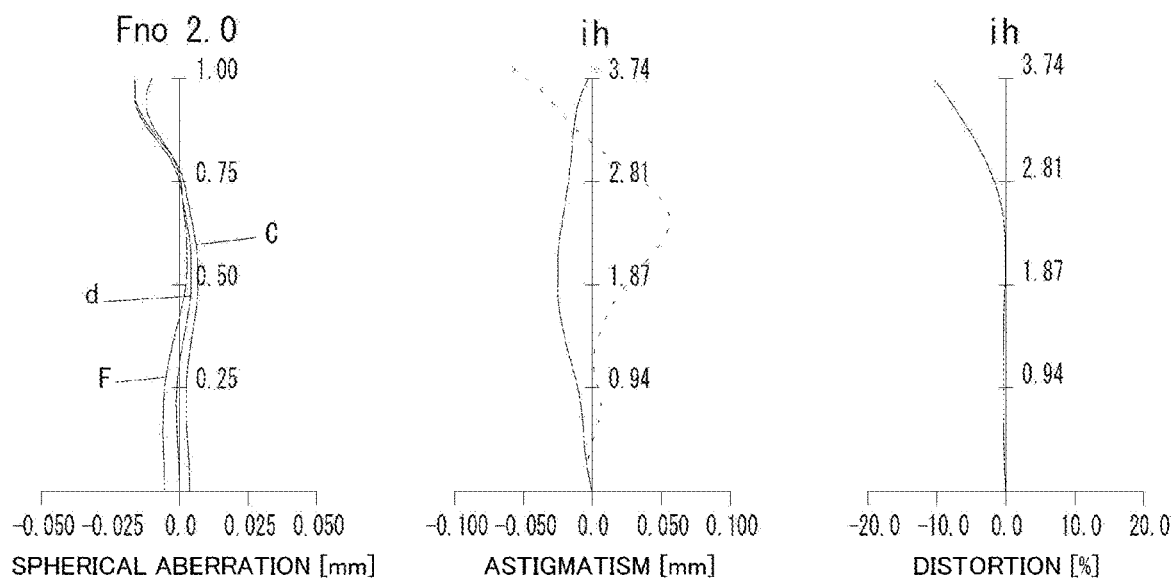
FIG. 6 shows spherical aberration, astigmatism, and distortion of the imaging lens in Example 3 according to the present invention.
Figure 7:
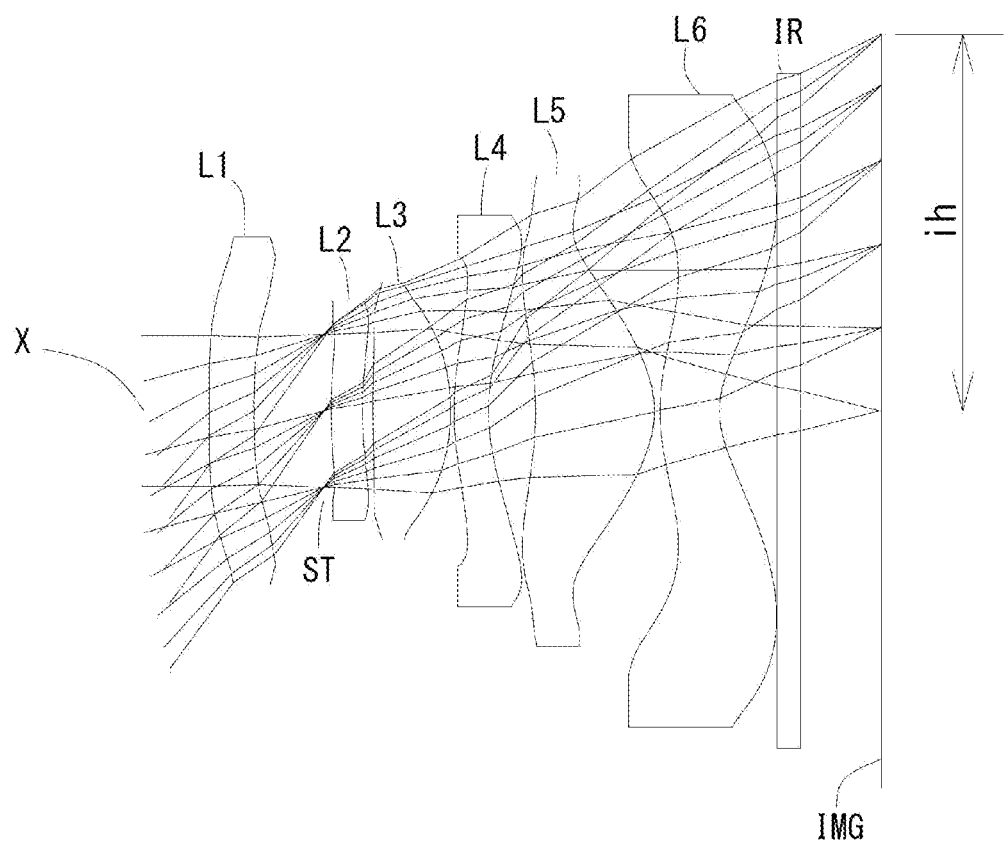
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

EXAMPLE 4

The basic lens data is shown below in Table 4.

TABLE 4

Example 4
Unit mm f = 2.75  ih = 3.74
Fno = 2.0  TTL = 5.92
ω (°) = 59.6

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4000 | 1.535 | 55.66 (vd1) |
| 2* | 14.6533 | 0.6220 | | |
| 3 (Stop) | Infinity | 0.0660 | | |
| 4* | 4.5706 | 0.2800 | 1.661 | 20.37 (vd2) |
| 5* | 3.6192 | 0.0920 | | |
| 6* | 11.7034 | 0.6940 | 1.535 | 55.66 (vd3) |
| 7* | −1.8407 | 0.0300 | | |
| 8* | 2.6467 | 0.3100 | 1.661 | 20.37 (vd4) |
| 9* | 1.9885 | 0.4190 | | |
| 10* | −2.9384 | 1.0600 | 1.535 | 55.66 (vd5) |
| 11* | −0.8951 | 0.0500 | | |
| 12* | 1.9510 | 0.5300 | 1.661 | 20.37 (vd6) |
| 13* | 0.7747 | 0.6000 | | |
| 14 | Infinity | 0.2100 | 1.517 | 64.20 |
| 15 | Infinity | 0.6323 | | |
| Image Plane | Infinity | | | |

Constituent Lens Data

| Lens | Start Surface | Focal Length | | Composite Focal Length |
|---|---|---|---|---|
| 1 | 1 | −27.399 | f12 | −13.886 |
| 2 | 4 | −29.804 | | |
| 3 | 6 | 3.028 | | |
| 4 | 8 | −14.892 | | |
| 5 | 10 | 2.038 | | |
| 6 | 12 | −2.369 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 2.257770E−03 |
| A4 | 9.123512E−02 | 1.360645E−01 | −4.742371E−02 | −4.051379E−02 | −1.114062E−02 | −4.162639E−02 |
| A6 | −3.344266E−02 | −4.291531E−02 | −2.120463E−01 | −1.145795E−01 | −1.104695E−01 | −1.549286E−02 |
| A8 | 9.211933E−03 | −6.515641E−02 | 8.416458E−01 | −9.435202E−02 | 4.337941E−03 | 1.077005E−01 |
| A10 | 1.169226E−04 | 1.482331E−01 | −2.739218E+00 | 7.871447E−01 | 2.856711E−01 | −3.817937E−01 |
| A12 | −1.208013E−03 | −1.342811E−01 | 4.324196E+00 | −1.572537E+00 | −2.589755E−01 | 6.628730E−01 |
| A14 | 1.520259E−04 | 5.219125E−02 | −2.867773E+00 | 1.412516E+00 | 7.336785E−02 | −5.636296E−01 |
| A16 | 0.000000E+00 | −7.304495E−03 | 0.000000E+00 | −5.142848E−01 | 0.000000E+00 | 2.134640E−01 |
| A18 | 0.000000E+00 | 0.000000E+00 | 0.000000E+00 | 0.000000E+00 | 0.000000E+00 | −1.899911E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.048044E+00 | −4.264429E−01 | −4.418604E+00 |
| A4 | −1.003042E−01 | −7.289640E−02 | 1.007375E−01 | 1.558834E−02 | −1.450524E−01 | −2.489929E−02 |
| A6 | 2.977065E−02 | −2.167052E−02 | −5.173890E−02 | −1.246545E−01 | 5.392497E−02 | −1.355824E−02 |
| A8 | −1.039876E−01 | −1.551444E−02 | 2.702114E−02 | 1.770526E−01 | −4.502592E−02 | 1.221598E−02 |
| A10 | 2.079562E−01 | 7.900214E−02 | −7.330990E−03 | −1.456107E−01 | 3.063344E−02 | −4.995542E−03 |
| A12 | −1.743830E−01 | −7.756400E−02 | 2.968235E−03 | 7.766321E−02 | −1.360784E−02 | 1.252192E−03 |
| A14 | 6.291173E−02 | 3.536905E−02 | −1.514725E−03 | −2.529032E−02 | 3.768048E−03 | −2.033435E−04 |
| A16 | −5.381873E−03 | −8.015245E−03 | 3.521523E−04 | 4.798692E−03 | −6.272151E−04 | 2.095615E−05 |
| A18 | −1.480729E−03 | 7.254899E−04 | −2.805287E−05 | −4.884715E−04 | 5.773216E−05 | −1.251673E−06 |
| A20 | 0.000000E+00 | 0.000000E+00 | 0.000000E+00 | 2.067404E−05 | −2.270161E−06 | 3.314183E−08 |

The imaging lens in Example 4 satisfies conditional expressions (1) to (14) as shown in Table 11.

Figure 8:
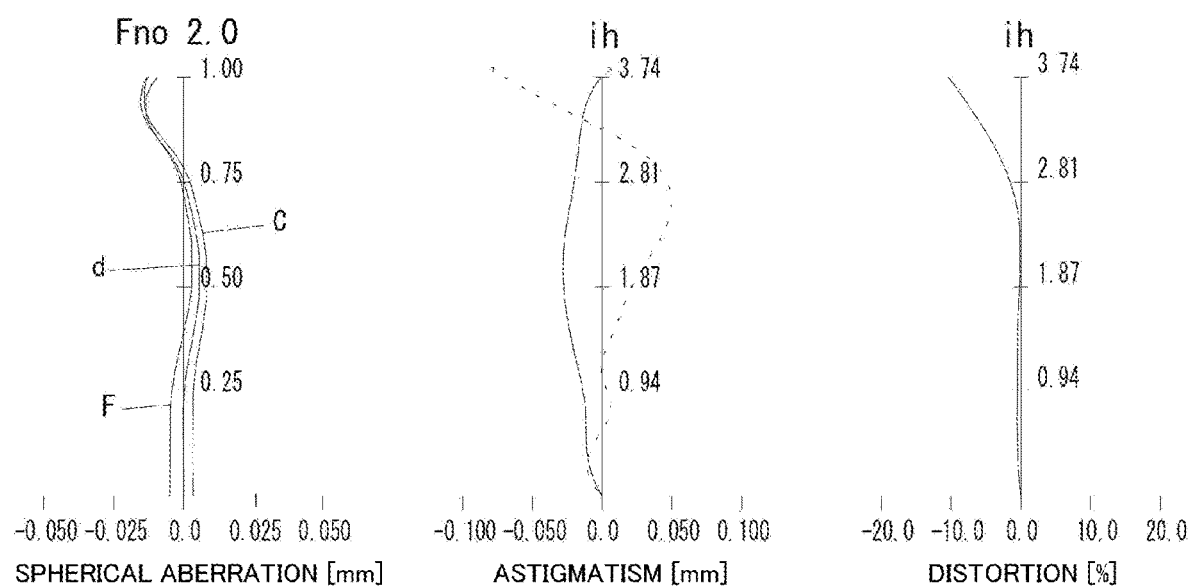
FIG. 8 shows spherical aberration, astigmatism, and distortion of the imaging lens in Example 4 according to the present invention.
Figure 9:
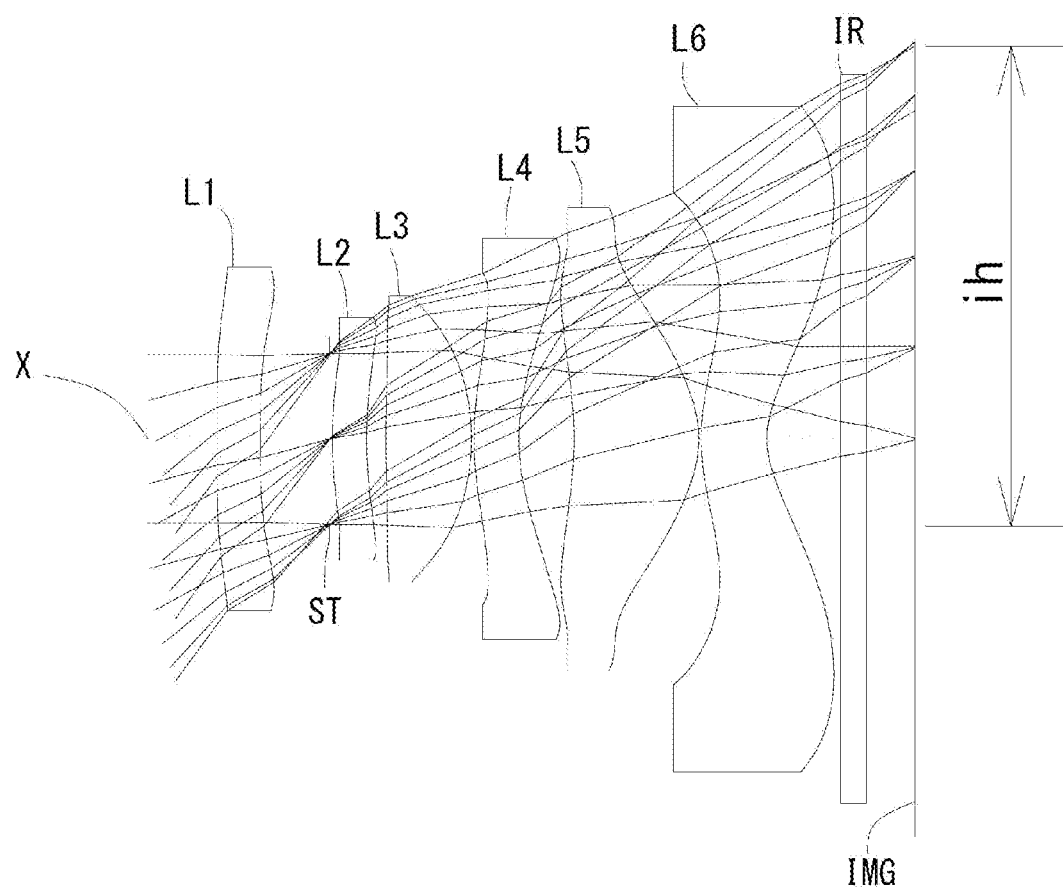
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

EXAMPLE 5

The basic lens data is shown below in Table 5.

TABLE 5

Example 5
Unit mm f = 2.75
Fno = 2.0
ω (°) = 58.9
ih = 3.74
TTL = 5.63

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.3532 | 1.535 | 55.66 (vd1) |
| 2* | 17.6434 | 0.5695 | | |
| 3 (Stop) | Infinity | 0.0200 | | |
| 4* | 3.6500 | 0.2800 | 1.535 | 55.66 (vd2) |
| 5* | 3.7500 | 0.1566 | | |
| 6* | 10.0463 | 0.6994 | 1.535 | 55.66 (vd3) |
| 7* | −1.8672 | 0.0200 | | |
| 8* | 2.5280 | 0.3669 | 1.661 | 20.37 (vd4) |
| 9* | 1.7648 | 0.4500 | | |
| 10* | −2.9692 | 1.0196 | 1.535 | 55.66 (vd5) |
| 11* | −0.8824 | 0.0200 | | |
| 12* | 1.8773 | 0.5362 | 1.661 | 20.37 (vd6) |
| 13* | 0.7086 | 0.6000 | | |
| 14 | Infinity | 0.2100 | 1.517 | 64.20 |
| 15 | Infinity | 0.3961 | | |
| Image Plane | Infinity | | | |

Constituent Lens Data

| Lens | Start Surface | Focal Length | | Composite Focal Length |
|---|---|---|---|---|
| 1 | 1 | −32.990 | f12 | −43.023 |
| 2 | 4 | 129.542 | | |
| 3 | 6 | 3.006 | | |
| 4 | 8 | −10.940 | | |
| 5 | 10 | 2.006 | | |
| 6 | 12 | −2.107 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | −4.802235E−02 |
| A4 | 5.750910E−02 | 8.675328E−02 | −4.236754E−03 | −5.484052E−03 | −1.683496E−02 | −4.039664E−02 |
| A6 | −2.205349E−02 | −8.523833E−03 | −1.670084E−01 | −9.691820E−02 | −8.487872E−02 | −2.312319E−02 |
| A8 | 4.889531E−03 | −8.481727E−02 | 7.816639E−01 | −1.050343E−02 | 5.206468E−03 | 5.024539E−02 |
| A10 | 3.925937E−04 | 1.530615E−01 | −2.893526E+00 | 5.578023E−01 | 1.730801E−01 | −1.127150E−01 |
| A12 | −1.601449E−03 | −1.393531E−01 | 5.003854E+00 | −1.288654E+00 | −1.349190E−01 | 8.830964E−02 |
| A14 | 3.137061E−04 | 5.719038E−02 | −3.439570E+00 | 1.267613E+00 | 2.674478E−02 | 6.207904E−02 |
| A16 | 0.000000E+00 | −8.566949E−03 | 0.000000E+00 | −5.118150E−01 | 0.000000E+00 | −1.244541E−01 |
| A18 | 0.000000E+00 | 0.000000E+00 | 0.000000E+00 | 0.000000E+00 | 0.000000E+00 | 4.818634E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.774252E+00 | −4.181255E−01 | −4.195586E+00 |
| A4 | −1.076991E−01 | −8.901537E−02 | 1.248261E−01 | −2.174713E−02 | −1.656539E−01 | −3.196510E−02 |
| A6 | −2.867322E−02 | −6.456981E−02 | −6.447918E−02 | −6.447918E−02 | 4.573293E−02 | −9.224416E−03 |
| A8 | 6.398217E−02 | 8.803468E−02 | 6.307939E−02 | 1.203661E−01 | −2.091244E−02 | 1.171656E−02 |
| A10 | −3.381646E−02 | −4.141847E−02 | −1.947489E−02 | −1.125381E−01 | 9.343818E−03 | −5.507608E−03 |
| A12 | 2.527314E−02 | 1.761080E−03 | 4.041332E−03 | 6.572937E−02 | −2.969995E−03 | 1.554839E−03 |
| A14 | −3.055435E−02 | 5.575154E−03 | −1.118956E−03 | −2.213915E−02 | 5.668209E−04 | −2.815807E−04 |
| A16 | 1.736126E−02 | −2.144160E−03 | 1.716538E−04 | 4.010347E−03 | −6.229768E−05 | 3.193989E−05 |
| A18 | −3.662398E−03 | 2.497878E−04 | −2.171556E−06 | −3.396305E−04 | 5.172195E−06 | −2.063151E−06 |
| A20 | 0.000000E+00 | 0.000000E+00 | 0.000000E+00 | 8.238605E−06 | −4.307589E−07 | 5.776893E−08 |

The imaging lens in Example 5 satisfies conditional expressions (1) to (14) as shown in Table 11.

Figure 10:
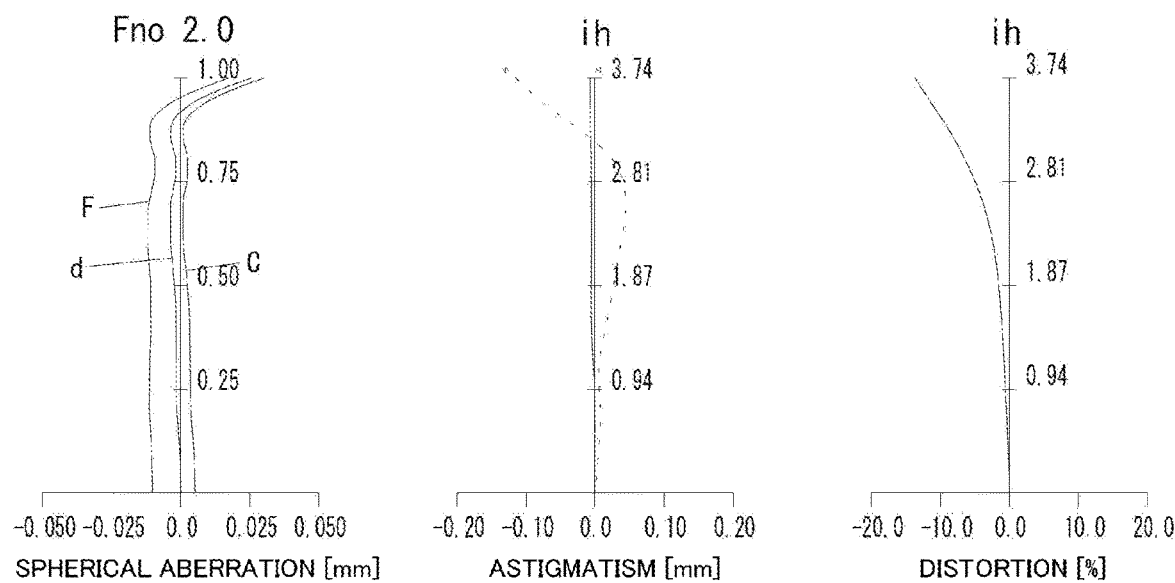
FIG. 10 shows spherical aberration, astigmatism, and distortion of the imaging lens in Example 5 according to the present invention.
Figure 11:
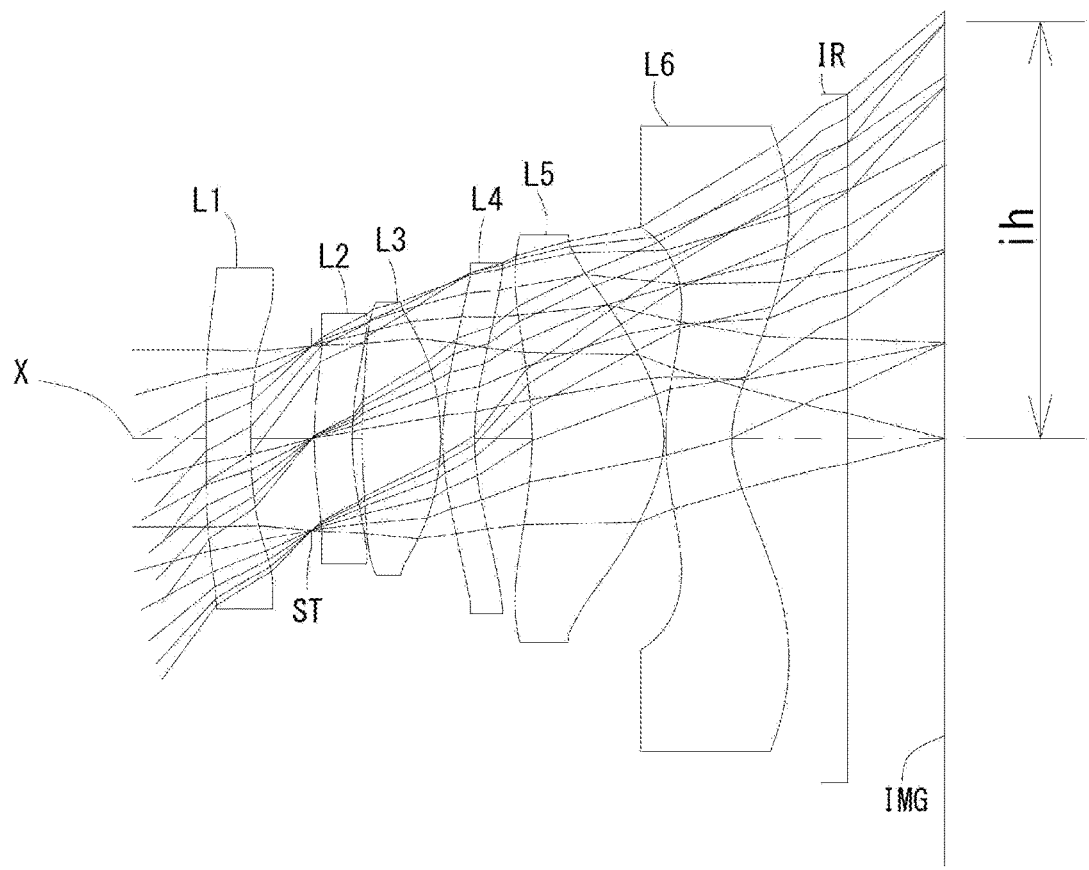
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

EXAMPLE 6

The basic lens data is shown below in Table 6.

TABLE 6

Example 6
Unit mm $f = 2.77$  $ih = 3.74$
$Fno = 2.0$  $TTL = 5.76$
$\omega\ (°) = 60.1$

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.3500 | 1.535 | 55.66 (vd1) |
| 2* | 5.2302 | 0.4869 | | |
| 3 (Stop) | Infinity | 0.0200 | | |
| 4* | 3.0496 | 0.2977 | 1.661 | 20.37 (vd2) |
| 5* | 2.2765 | 0.0800 | | |
| 6* | 5.9587 | 0.6150 | 1.535 | 55.66 (vd3) |
| 7* | −2.0090 | 0.0200 | | |
| 8* | 2.1400 | 0.2500 | 1.535 | 55.66 (vd4) |
| 9* | 2.1500 | 0.4500 | | |
| 10* | −2.8022 | 1.0427 | 1.535 | 55.66 (vd5) |
| 11* | −0.8890 | 0.0150 | | |
| 12* | 2.0709 | 0.5199 | 1.661 | 20.37 (vd6) |
| 13* | 0.8036 | 0.7000 | | |
| 14 | Infinity | 0.2100 | 1.517 | 64.20 |
| 15 | Infinity | 0.7695 | | |
| Image Plane | Infinity | | | |

Constituent Lens Data

| Lens | Start Surface | Focal Length | | Composite Focal Length |
|---|---|---|---|---|
| 1 | 1 | −9.780 | f12 | −5.777 |
| 2 | 4 | −16.049 | | |
| 3 | 6 | 2.887 | | |
| 4 | 8 | 88.588 | | |
| 5 | 10 | 2.046 | | |
| 6 | 12 | −2.375 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | −2.960033E−01 |
| A4 | 7.555365E−02 | 1.185590E−01 | −6.580203E−02 | −6.642254E−02 | −5.041525E−03 | −4.401786E−02 |
| A6 | −3.029738E−02 | −2.443189E−02 | −1.761831E−01 | −7.588579E−02 | −9.229519E−02 | −1.117402E−02 |
| A8 | 2.923552E−03 | −8.401158E−02 | 9.079433E−01 | −2.497852E−02 | 2.711255E−02 | 2.210959E−02 |
| A10 | 9.306678E−04 | 1.461858E−01 | −3.099181E+00 | 4.837207E−01 | 1.759559E−01 | −5.136807E−02 |
| A12 | −1.688129E−03 | −1.452087E−01 | 4.872636E+00 | −1.107974E+00 | −1.461813E−01 | 3.383290E−02 |
| A14 | 3.472267E−04 | 4.391010E−02 | −3.038971E+00 | 1.061126E+00 | 3.638972E−02 | 7.471816E−02 |
| A16 | 0.000000E+00 | 2.878904E−03 | 0.000000E+00 | −3.978602E−01 | 0.000000E+00 | −1.071357E−01 |
| A18 | 0.000000E+00 | 0.000000E+00 | 0.000000E+00 | 0.000000E+00 | 0.000000E+00 | 5.163625E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.501013E+00 | −8.336476E−01 | −4.695607E+00 |
| A4 | −1.022636E−01 | −6.217144E−02 | 1.120779E−01 | −2.758241E−02 | −1.396780E−01 | −3.021344E−02 |
| A6 | −2.449497E−02 | −7.741381E−02 | −8.341637E−02 | −6.663734E−02 | 3.136759E−02 | −1.285240E−02 |
| A8 | 5.403240E−02 | 9.076961E−02 | 6.017004E−02 | 1.174418E−01 | −1.830323E−02 | 1.281773E−02 |
| A10 | −2.711429E−02 | −3.869055E−02 | −2.215987E−02 | −1.082467E−01 | 8.406083E−03 | −5.709238E−03 |

TABLE 6-continued

Example 6
Unit mm

|     |               |               |               |               |               |               |
| --- | ------------- | ------------- | ------------- | ------------- | ------------- | ------------- |
| A12 | 2.728897E−02  | −3.006156E−04 | 4.552378E−03  | 6.296916E−02  | −2.710261E−03 | 1.591781E−03  |
| A14 | −3.532458E−02 | 6.417734E−03  | −7.458277E−04 | −2.154652E−02 | 5.183462E−04  | −2.871478E−04 |
| A16 | 2.000628E−02  | −2.263888E−03 | 1.105277E−04  | 4.182552E−03  | −7.554630E−05 | 3.236058E−05  |
| A18 | −4.046704E−03 | 2.383916E−04  | −5.413468E−06 | −4.290407E−04 | 5.808069E−06  | −2.069043E−06 |
| A20 | 0.000000E+00  | 0.000000E+00  | 0.000000E+00  | 1.684128E−05  | 0.000000E+00  | 5.776456E−08  |

The imaging lens in Example 6 satisfies conditional expressions (1) to (14) as shown in Table 11.

Figure 12:
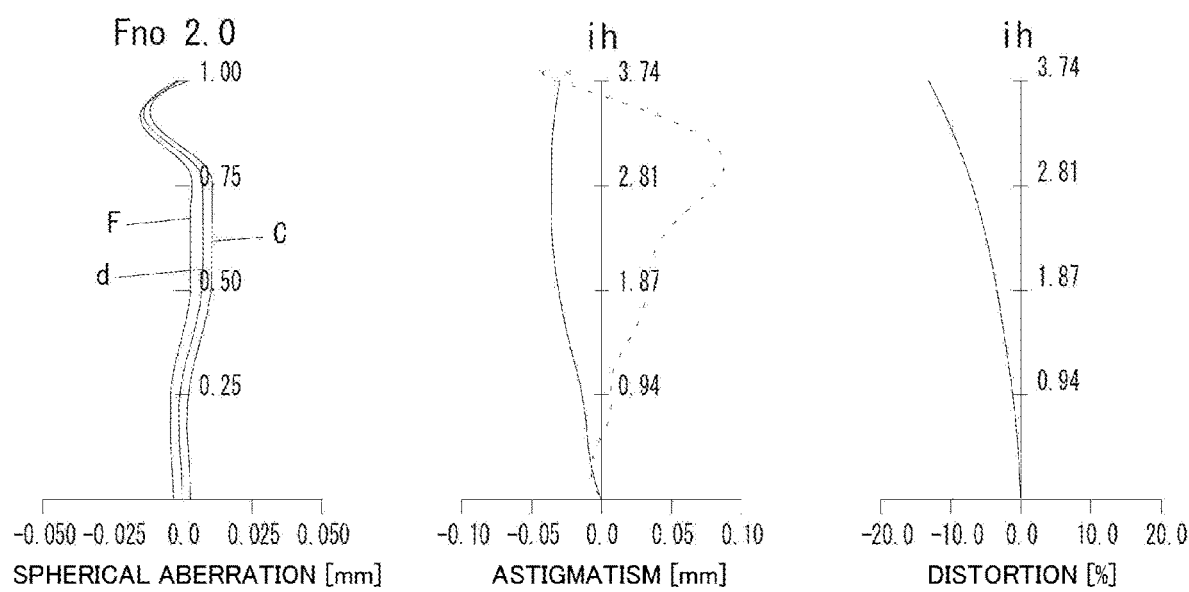
FIG. 12 shows spherical aberration, astigmatism, and distortion of the imaging lens in Example 6 according to the present invention.
Figure 13:
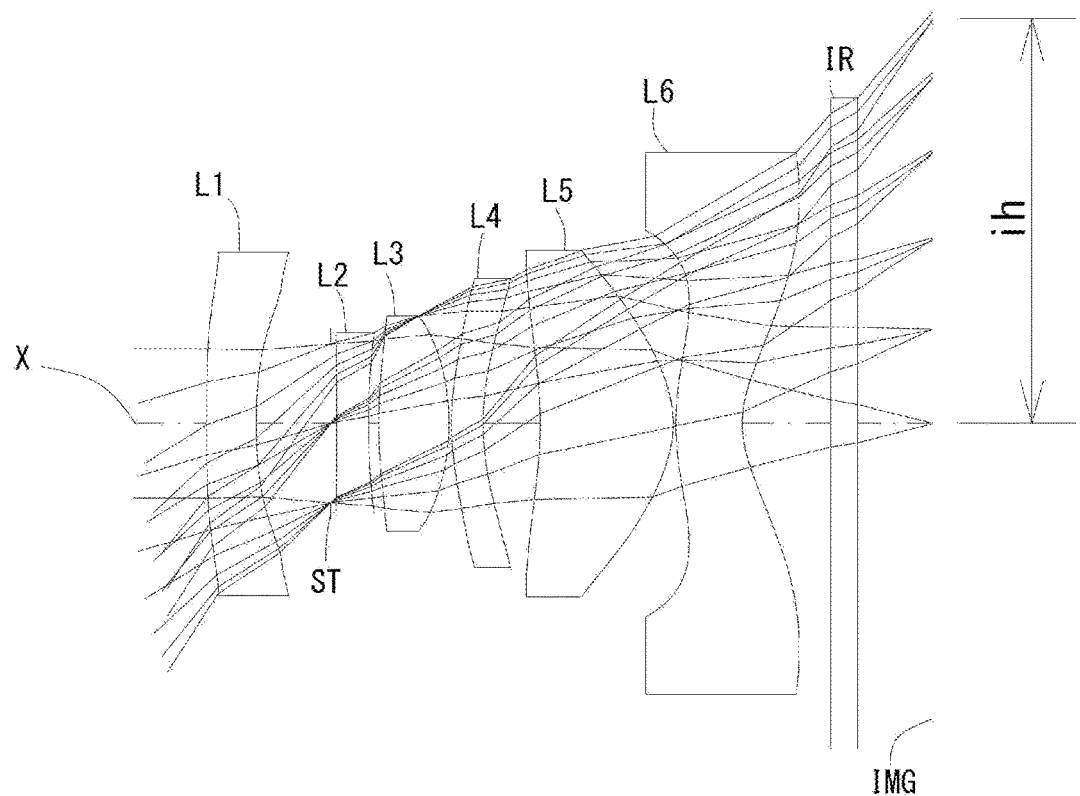
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

EXAMPLE 7

The basic lens data is shown below in Table 7.

TABLE 7

Example 7
Unit mm $f = 2.41$       $ih = 3.74$
$Fno = 2.0$      $TTL = 5.66$
$\omega\ (°) = 65.2$ Surface Data

| Surface Number i | Curvature Radius r | Surface Distance d | Refractive Index Nd | Abbe Number vd |
| --- | --- | --- | --- | --- |
| (Object) | Infinity | Infinity | | |
| 1* | 1000.0000 | 0.3898 | 1.535 | 55.66 (vd1) |
| 2* | 4.6147 | 0.5886 | | |
| 3 (Stop) | Infinity | 0.0500 | | |
| 4* | −80.0000 | 0.2500 | 1.661 | 20.37 (vd2) |
| 5* | 6.4380 | 0.0800 | | |
| 6* | 3.8890 | 0.5527 | 1.544 | 55.86 (vd3) |
| 7* | −1.9124 | 0.0200 | | |
| 8* | 2.2863 | 0.2500 | 1.535 | 55.66 (vd4) |
| 9* | 2.0683 | 0.4500 | | |
| 10* | −3.1072 | 1.0535 | 1.544 | 55.86 (vd5) |
| 11* | −0.8529 | 0.0200 | | |
| 12* | 2.1182 | 0.5226 | 1.661 | 20.37 (vd6) |
| 13* | 0.7791 | 0.7000 | | |
| 14 | Infinity | 0.2100 | 1.517 | 64.20 |
| 15 | Infinity | 0.5935 | | |
| Image Plane | Infinity | | | |

Constituent Lens Data

| Lens | Start Surface | Focal Length | Composite Focal Length | |
| --- | --- | --- | --- | --- |
| 1 | 1 | −8.670 | f12 | −4.232 |
| 2 | 4 | −9.008 | | |
| 3 | 6 | 2.437 | | |
| 4 | 8 | −67.560 | | |
| 5 | 10 | 1.854 | | |
| 6 | 12 | −2.208 | | |

Aspheric Surface Data

|     | First Surface | Second Surface | Fourth Surface | Fifth Surface | Sixth Surface | Seventh Surface |
| --- | ------------- | -------------- | -------------- | ------------- | ------------- | --------------- |
| k   | 0.000000E+00  | 0.000000E+00   | 0.000000E+00   | 0.000000E+00  | 0.000000E+00  | −8.995137E−02   |
| A4  | 7.626435E−02  | 1.277610E−01   | −1.185431E−03  | 1.988890E−03  | −3.484249E−02 | −4.587174E−02   |
| A6  | −3.114358E−02 | −1.902449E−02  | −1.711177E−01  | −1.588755E−02 | −7.840409E−02 | −2.636755E−02   |
| A8  | 3.461076E−03  | −8.805721E−02  | 9.509902E−01   | −6.298665E−03 | 1.260429E−02  | 9.769221E−03    |
| A10 | 1.140529E−03  | 1.451236E−01   | −3.075639E+00  | 5.265459E−01  | 1.558134E−01  | −6.785887E−02   |
| A12 | −1.659191E−03 | −1.452295E−01  | 4.863482E+00   | −1.070640E+00 | −1.453471E−01 | 2.185526E−02    |
| A14 | 3.408773E−04  | 4.423401E−02   | −3.101594E+00  | 1.012521E+00  | 4.769505E−02  | 7.178140E−02    |

TABLE 7-continued

Example 7
Unit mm

| | | | | | | |
|---|---|---|---|---|---|---|
| A16 | 0.000000E+00 | 2.975078E−03 | 0.000000E+00 | −4.259268E−01 | 0.000000E+00 | −1.077498E−01 |
| A18 | 0.000000E+00 | 0.000000E+00 | 0.000000E+00 | 0.000000E+00 | 0.000000E+00 | 5.604373E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.423312E+00 | −1.537427E+00 | −4.849514E+00 |
| A4 | −1.005059E−01 | −5.888152E−02 | 1.165431E−01 | −3.769127E−02 | −1.425119E−01 | −3.034270E−02 |
| A6 | −2.304975E−02 | −7.638769E−02 | −8.506862E−02 | −6.744414E−02 | 3.298424E−02 | −1.272925E−02 |
| A8 | 5.460353E−02 | 9.173152E−02 | 5.947683E−02 | 1.173146E−01 | −2.180513E−02 | 1.285640E−02 |
| A10 | −2.531854E−02 | −3.849825E−02 | −2.230808E−02 | −1.081991E−01 | 7.721345E−03 | −5.703174E−03 |
| A12 | 2.851181E−02 | −4.748870E−04 | 4.445036E−03 | 6.301345E−02 | −2.546367E−03 | 1.592232E−03 |
| A14 | −3.498027E−02 | 6.286599E−03 | −8.718720E−04 | −2.153152E−02 | 5.939486E−04 | −2.872829E−04 |
| A16 | 1.986883E−02 | −2.288462E−03 | 9.545266E−08 | 4.184447E−03 | −8.208226E−05 | 3.235514E−05 |
| A18 | −4.247568E−03 | 2.669516E−04 | −7.744983E−05 | −4.301274E−04 | −9.584363E−06 | −2.069043E−06 |
| A20 | 0.000000E+00 | 0.000000E+00 | 0.000000E+00 | 1.584850E−05 | 0.000000E+00 | 5.776456E−08 |

The imaging lens in Example 7 satisfies conditional expressions (1) to (14) as shown in Table 11.

Figure 14:
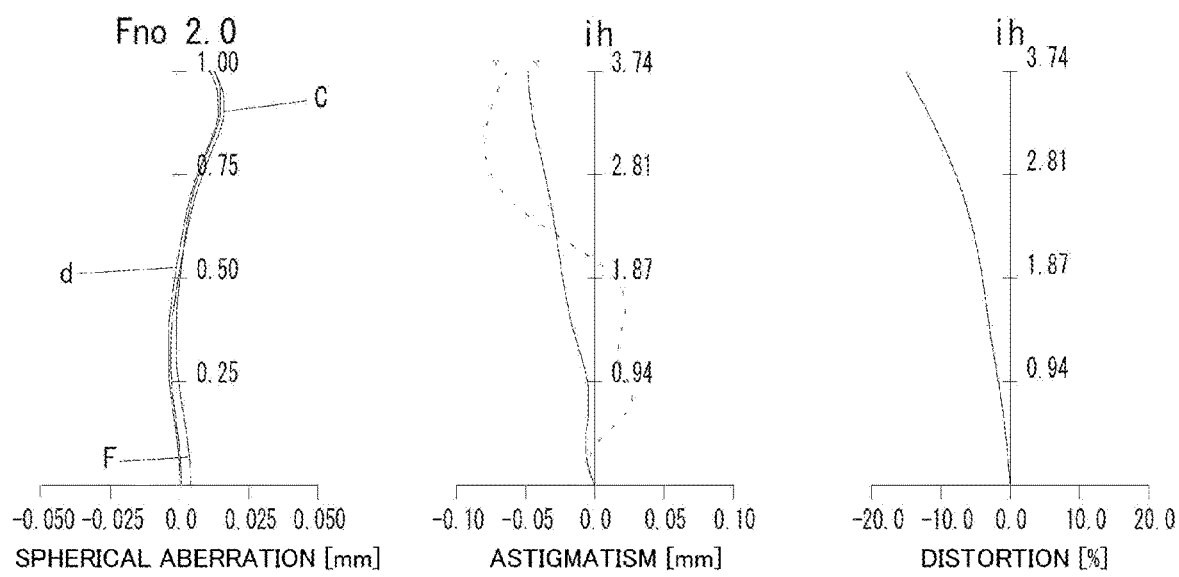
FIG. 14 shows spherical aberration, astigmatism, and distortion of the imaging lens in Example 7 according to the present invention.
Figure 15:
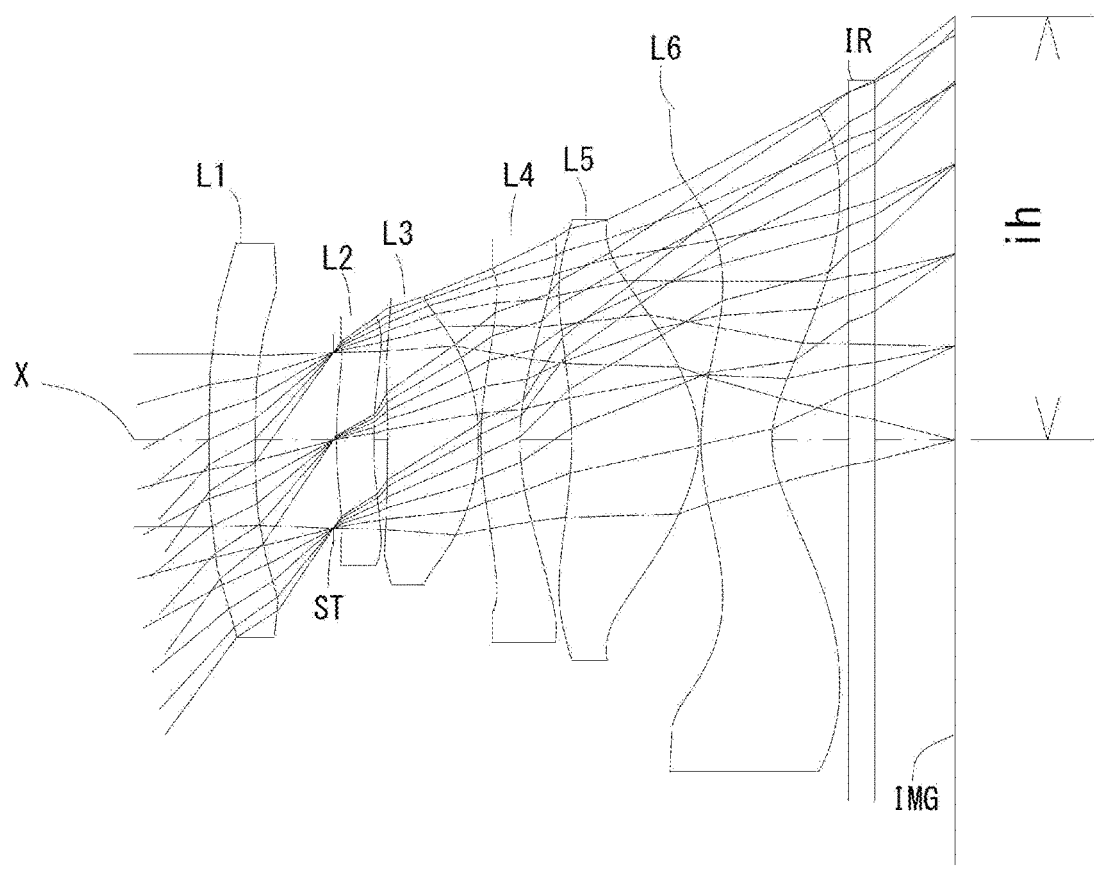
FIG. 15 is a schematic view showing a general configuration of an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

EXAMPLE 8

The basic lens data is shown below in Table 8.

TABLE 8

Example 8
Unit mm

| | | | | |
|---|---|---|---|---|
| ft = 2.72 | | | ih = 3.74 | |
| Fno = 2.0 | | | TTL = 5.77 | |
| ω (°) = 58.4 | | | | |

Surface Data

| Surface Number i | Curvature Radius r | Surface Distance d | Refractive Index Nd | Abbe Number νd |
|---|---|---|---|---|
| (Object) | Infinity | Infinity | | |
| 1* | −1000.0000 | 0.3593 | 1.535 | 55.66 (vd1) |
| 2* | 15.7458 | 0.6173 | | |
| 3 (Stop) | Infinity | 0.0236 | | |
| 4* | 3.6015 | 0.2938 | 1.661 | 20.37 (vd2) |
| 5* | 3.4327 | 0.1060 | | |
| 6* | −100.0000 | 0.7105 | 1.535 | 55.66 (vd3) |
| 7* | −1.7706 | 0.0200 | | |
| 8* | 2.5807 | 0.3060 | 1.661 | 20.37 (vd4) |
| 9* | 1.9933 | 0.4033 | | |
| 10* | −3.1600 | 0.9967 | 1.535 | 55.66 (vd5) |
| 11* | −0.9231 | 0.0200 | | |
| 12* | 1.9148 | 0.5547 | 1.661 | 20.37 (vd6) |
| 13* | 0.7771 | 0.6000 | | |
| 14 | Infinity | 0.2100 | 1.517 | 64.20 |
| 15 | Infinity | 0.6220 | | |
| Image Plane | Infinity | | | |

Constituent Lens Data

| Lens | Start Surface | Focal Length | | Composite Focal Length |
|---|---|---|---|---|
| 1 | 1 | −28.982 | f12 | −25.964 |
| 2 | 4 | −360.448 | | |
| 3 | 6 | 3.362 | | |
| 4 | 8 | −16.720 | | |
| 5 | 10 | 2.111 | | |
| 6 | 12 | −2.456 | | |

TABLE 8-continued

Example 8
Unit mm

Aspheric Surface Data

|  | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | −2.025941E−02 |
| A4 | 8.395226E−02 | 1.230869E−01 | −5.407090E−02 | −4.481620E−02 | −2.068765E−02 | −5.541100E−02 |
| A6 | −2.555295E−02 | −2.693095E−02 | −2.001302E−01 | −9.425768E−02 | −8.731540E−02 | 5.701747E−03 |
| A8 | 4.467510E−03 | −8.140859E−02 | 8.967074E−01 | −4.368438E−02 | 2.875393E−02 | 2.311518E−02 |
| A10 | 1.867070E−03 | 1.556494E−01 | −3.072310E+00 | 4.803640E−01 | 1.731805E−01 | −5.500669E−02 |
| A12 | −1.461736E−03 | −1.315788E−01 | 4.905711E+00 | −1.103168E+00 | −1.476893E−01 | 3.250349E−02 |
| A14 | 1.433183E−04 | 4.925620E−02 | −3.231275E+00 | 1.065145E+00 | 4.077844E−02 | 7.393130E−02 |
| A16 | 0.000000E+00 | −6.725895E−03 | 0.000000E+00 | −4.087096E−01 | 0.000000E+00 | −1.098541E−01 |
| A18 | 0.000000E+00 | 0.000000E+00 | 0.000000E+00 | 0.000000E+00 | 0.000000E+00 | 4.551359E−02 |
| A20 | 0.000000E+00 | 0.000000E+00 | 0.000000E+00 | 0.000000E+00 | 0.000000E+00 | 0.000000E+00 |

|  | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.510938E+00 | −4.503740E−01 | −4.333897E+00 |
| A4 | −9.566748E−02 | −6.129844E−02 | 1.126030E−01 | −2.304044E−02 | −1.416719E−01 | −2.335943E−02 |
| A6 | −2.788352E−02 | −7.582507E−02 | −8.421387E−02 | −6.699736E−02 | 3.646114E−02 | −1.380561E−02 |
| A8 | 5.362557E−02 | 9.034103E−02 | 6.030672E−02 | 1.175763E−01 | −1.832796E−02 | 1.285611E−02 |
| A10 | −2.729367E−02 | −3.900840E−02 | −2.206832E−02 | −1.082152E−01 | 8.506427E−03 | −5.707740E−03 |
| A12 | 2.712929E−02 | −4.333986E−04 | 4.574940E−03 | 6.298086E−02 | −2.670276E−03 | 1.591463E−03 |
| A14 | −3.546525E−02 | 6.399239E−03 | −7.462789E−04 | −2.154860E−02 | 5.334928E−04 | −2.871496E−04 |
| A16 | 1.994592E−02 | −2.246046E−03 | 1.090669E−04 | 4.182242E−03 | −7.196833E−05 | 3.236807E−05 |
| A18 | −4.066461E−03 | 2.540376E−04 | −7.981749E−06 | −4.282870E−04 | 6.925351E−06 | −2.068651E−06 |
| A20 | 0.000000E+00 | 0.000000E+00 | 0.000000E+00 | 1.802881E−05 | −3.559254E−07 | 5.727447E−08 |

The imaging lens in Example 8 satisfies conditional expressions (1) to (14) as shown in Table 11.

Figure 16:
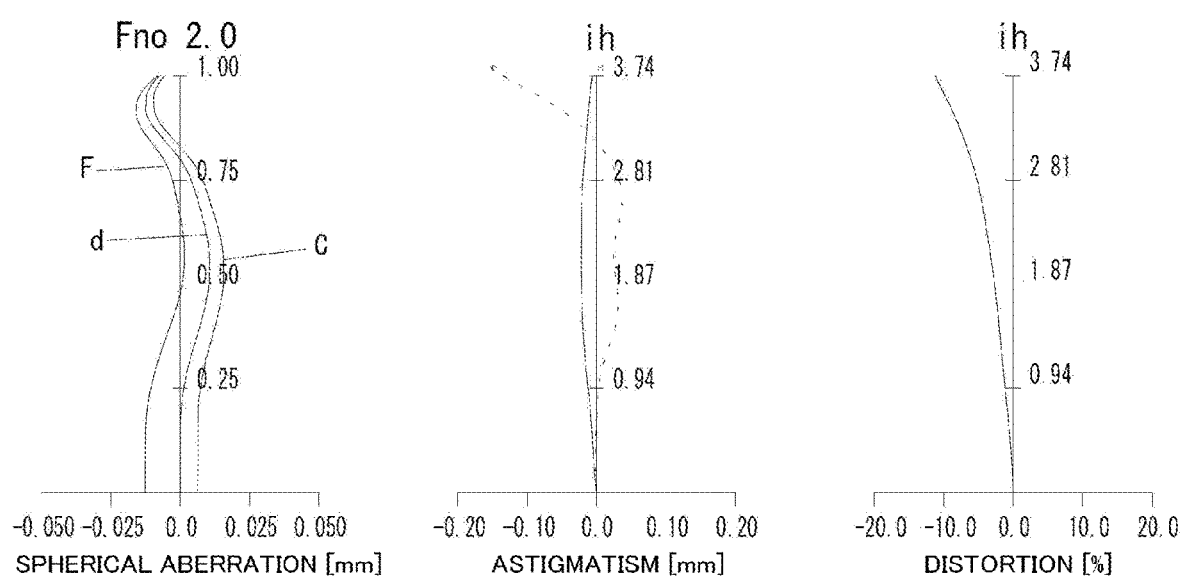
FIG. 16 shows spherical aberration, astigmatism, and distortion of the imaging lens in Example 8 according to the present invention.
Figure 17:
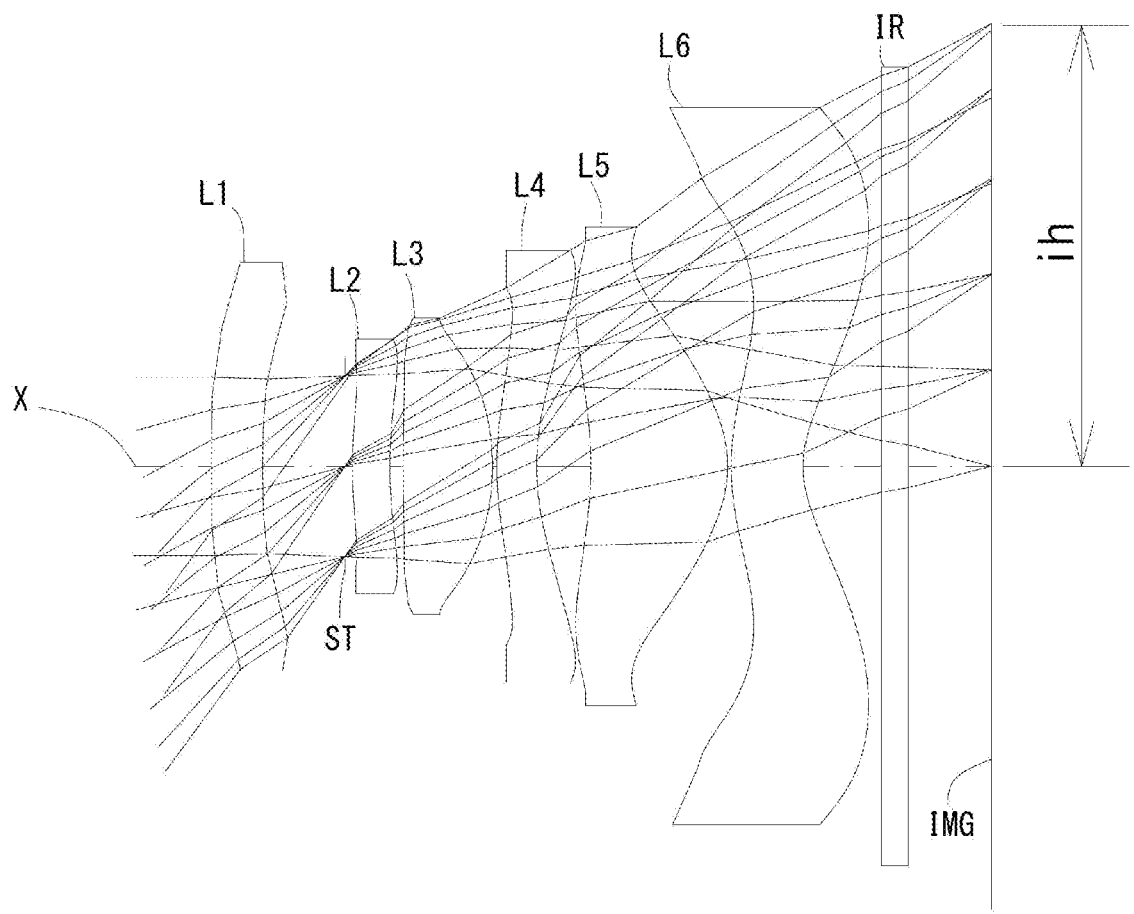
FIG. 17 is a schematic view showing the general configuration of an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

EXAMPLE 9

The basic lens data is shown below in Table 9.

TABLE 9

Example 9
Unit mm f = 2.74          ih = 3.74
Fno = 2.0         TTL = 5.93
ω (°) = 58.1

Surface Data

| Surface Number i | Curvature Radius r | Surface Distance d | Refractive Index Nd | Abbe Number vd |
|---|---|---|---|---|
| (Object) | Infinity | Infinity | | |
| 1* | 350.0000 | 0.3948 | 1.535 | 55.66 (vd1) |
| 2* | 14.4277 | 0.6324 | | |
| 3 (Stop) | Infinity | 0.0604 | | |
| 4* | 4.1974 | 0.2866 | 1.661 | 20.37 (vd2) |
| 5* | 3.4190 | 0.1015 | | |
| 6* | 12.3880 | 0.6887 | 1.535 | 55.66 (vd3) |
| 7* | −1.8414 | 0.0334 | | |
| 8* | 2.6768 | 0.3055 | 1.661 | 20.37 (vd4) |
| 9* | 1.9768 | 0.4174 | | |
| 10* | −2.9619 | 1.0541 | 1.535 | 55.66 (vd5) |
| 11* | −0.9015 | 0.0260 | | |
| 12* | 1.9223 | 0.5523 | 1.661 | 20.37 (vd6) |
| 13* | 0.7758 | 0.6000 | | |

TABLE 9-continued

Example 9
Unit mm

| | | | | |
|---|---|---|---|---|
| 14 | Infinity | 0.2100 | 1.517 | 64.20 |
| 15 | Infinity | 0.6385 | | |
| Image Plane | Infinity | | | |

Constituent Lens Data

| Lens | Start Surface | Focal Length | | Composite Focal Length |
|---|---|---|---|---|
| 1 | 1 | −28.149 | f12 | −14.697 |
| 2 | 4 | −32.691 | | |
| 3 | 6 | 3.049 | | |
| 4 | 8 | −13.845 | | |
| 5 | 10 | 2.057 | | |
| 6 | 12 | −2.435 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 2.375025E−02 |
| A4 | 8.403664E−02 | 1.237257E−01 | −5.119931E−02 | −4.584659E−02 | −2.105770E−02 | −5.394049E−02 |
| A6 | −2.594545E−02 | −2.598836E−02 | −1.999341E−01 | −9.113064E−02 | −8.571970E−02 | 2.312208E−03 |
| A8 | 4.482584E−03 | −8.147010E−02 | 8.939079E−01 | −3.827520E−02 | 2.700828E−02 | 2.188095E−02 |
| A10 | 1.909312E−03 | 1.554892E−01 | −3.080339E+00 | 4.854759E−01 | 1.712837E−01 | −5.501850E−02 |
| A12 | −1.442374E−03 | −1.316255E−01 | 4.914155E+00 | −1.099505E+00 | −1.484270E−01 | 3.297727E−02 |
| A14 | 1.495100E−04 | 4.923703E−02 | −3.189719E+00 | 1.066126E+00 | 4.031314E−02 | 7.447726E−02 |
| A16 | 0.000000E+00 | −6.703460E−03 | 0.000000E+00 | −4.103690E−01 | 0.000000E+00 | −1.093168E−01 |
| A18 | 0.000000E+00 | 0.000000E+00 | 0.000000E+00 | 0.000000E+00 | 0.000000E+00 | 4.587995E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.390136E+00 | −4.399879E−01 | −4.404649E+00 |
| A4 | −9.539072E−02 | −5.985412E−02 | 1.135954E−01 | −2.370829E−02 | −1.395500E−01 | −2.574751E−02 |
| A6 | −2.674524E−02 | −7.590253E−02 | −8.437317E−02 | −6.699484E−02 | 3.638700E−02 | −1.347042E−02 |
| A8 | 5.405046E−02 | 9.030604E−02 | 6.025801E−02 | 1.176160E−01 | −1.836606E−02 | 1.283185E−02 |
| A10 | −2.717433E−02 | −3.901441E−02 | −2.207866E−02 | −1.082053E−01 | 8.503338E−03 | −5.710327E−03 |
| A12 | 2.715267E−02 | −4.332825E−04 | 4.573021E−03 | 6.298274E−02 | −2.670608E−03 | 1.591390E−03 |
| A14 | −3.546557E−02 | 6.399518E−03 | −7.469059E−04 | −2.154826E−02 | 5.334069E−04 | −2.871492E−04 |
| A16 | 1.994236E−02 | −2.245874E−03 | 1.090259E−04 | 4.182308E−03 | −7.199520E−05 | 3.236807E−05 |
| A18 | −4.068949E−03 | 2.540660E−04 | −7.970359E−06 | −4.282907E−04 | 6.925251E−06 | −2.068651E−06 |
| A20 | 0.000000E+00 | 0.000000E+00 | 0.000000E+00 | 1.803449E−05 | −3.559254E−07 | 5.727447E−08 |

The imaging lens in Example 9 satisfies conditional expressions (1) to (14) as shown in Table 11.

Figure 18:
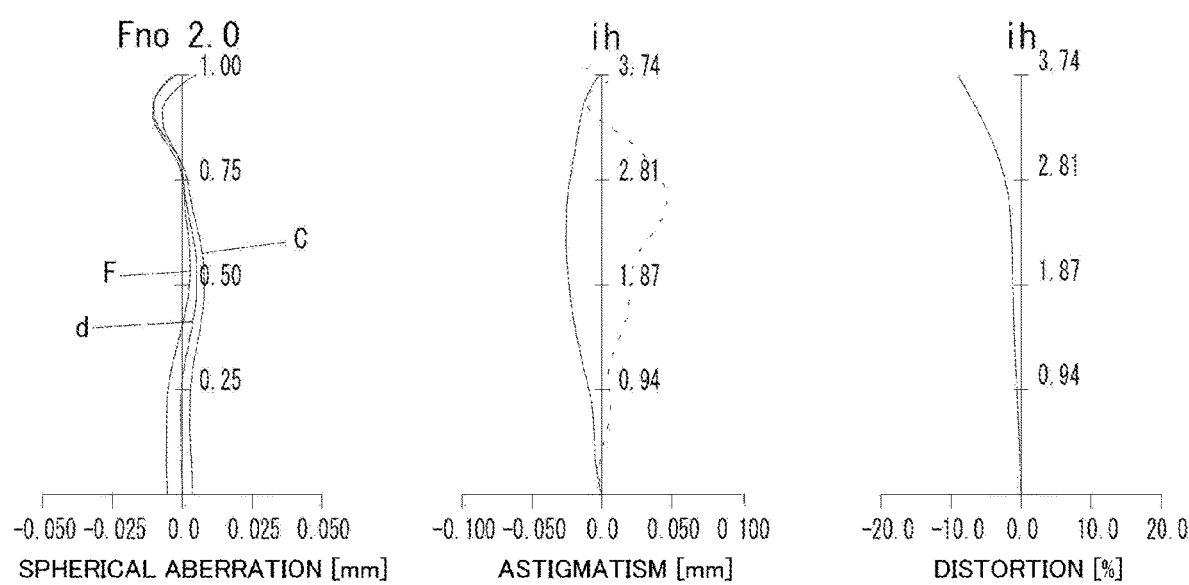
FIG. 18 shows spherical aberration, astigmatism, and distortion of the imaging lens in Example 9 according to the present invention.
Figure 19:
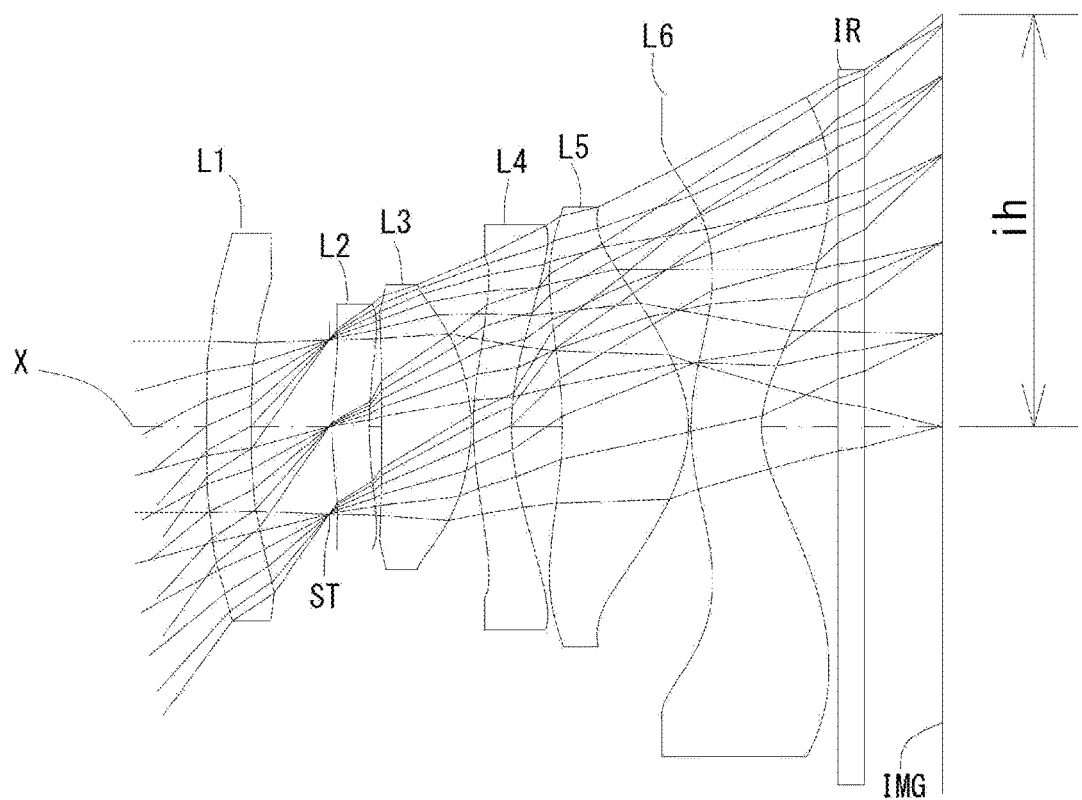
FIG. 19 is a schematic view showing the general configuration of an imaging lens in Example 10 according to the present invention.

FIG. 18 shows spherical aberration (mm), astigmatism (mm), and distortion (%) of the imaging lens in Example 9. As shown in FIG. 18, each aberration is corrected excellently.

EXAMPLE 10

The basic lens data is shown below in Table 10.

TABLE 10

Example10
Unit mm f = 2.71　　　　　　　ih = 3.74
Fno = 2.0　　　　　　TTL = 5.73
ω (°) = 59.6

Surface Data

| Surface Number i | Curvature Radius r | Surface Distance d | Refractive Index Nd | Abbe Number vd |
|---|---|---|---|---|
| (Object) | Infinity | Infinity | | |
| 1* | −350.0000 | 0.3500 | 1.535 | 55.66 (vd1) |
| 2* | 15.9707 | 0.6200 | | |
| 3 (Stop) | Infinity | 0.0250 | | |
| 4* | 3.6263 | 0.2900 | 1.661 | 20.37 (vd2) |

TABLE 10-continued

Example10
Unit mm

| | | | | |
|---|---|---|---|---|
| 5* | 3.3652 | 0.1000 | | |
| 6* | 90.7925 | 0.7000 | 1.535 | 55.66 (vd3) |
| 7* | −1.7705 | 0.0200 | | |
| 8* | 2.5844 | 0.3000 | 1.661 | 20.37 (vd4) |
| 9* | 1.9860 | 0.4000 | | |
| 10* | −3.1337 | 1.0000 | 1.535 | 55.66 (vd5) |
| 11* | −0.9242 | 0.0200 | | |
| 12* | 1.9210 | 0.5550 | 1.661 | 20.37 (vd6) |
| 13* | 0.7764 | 0.6000 | | |
| 14 | Infinity | 0.2100 | 1.517 | 64.20 |
| 15 | Infinity | 0.6156 | | |
| Image Plane | Infinity | | | |

Constituent Lens Data

| Lens | Start Surface | Focal Length | | Composite Focal Length |
|---|---|---|---|---|
| 1 | 1 | −28.550 | f12 | −22.575 |
| 2 | 4 | −126.780 | | |
| 3 | 6 | 3.256 | | |
| 4 | 8 | −16.216 | | |
| 5 | 10 | 2.117 | | |
| 6 | 12 | −2.444 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | −1.297166E−02 |
| A4 | 8.289871E−02 | 1.229968E−01 | −5.517647E−02 | −4.483239E−02 | −2.081083E−02 | −5.539486E−02 |
| A6 | −2.574689E−02 | −2.688878E−02 | −1.986867E−01 | −9.413024E−02 | −8.755165E−02 | 5.616382E−03 |
| A8 | 4.445651E−03 | −8.139966E−02 | 8.987600E−01 | −4.335578E−02 | 2.851496E−02 | 2.316938E−02 |
| A10 | 1.869601E−03 | 1.556494E−01 | −3.069752E+00 | 4.808339E−01 | 1.726732E−01 | −5.486146E−02 |
| A12 | −1.461952E−03 | −1.315788E−01 | 4.904407E+00 | −1.102315E+00 | −1.480346E−01 | 3.259247E−02 |
| A14 | 1.434937E−04 | 4.925619E−02 | −3.222022E+00 | 1.065990E+00 | 4.050571E−02 | 7.411783E−02 |
| A16 | 0.000000E+00 | −6.725895E−03 | 0.000000E+00 | −4.078570E−01 | 0.000000E+00 | −1.097465E−01 |
| A18 | 0.000000E+00 | 0.000000E+00 | 0.000000E+00 | 0.000000E+00 | 0.000000E+00 | 4.558696E−02 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −3.529900E+00 | −4.500298E−01 | −4.312506E+00 |
| A4 | −9.519902E−02 | −6.144185E−02 | 1.129504E−01 | −2.299903E−02 | −1.417029E−01 | −2.361352E−02 |
| A6 | −2.771095E−02 | −7.589860E−02 | −8.418503E−02 | −6.700347E−02 | 3.642197E−02 | −1.379781E−02 |
| A8 | 5.365992E−02 | 9.033326E−02 | 6.030930E−02 | 1.175743E−01 | −1.832544E−02 | 1.285532E−02 |
| A10 | −2.729340E−02 | −3.900802E−02 | −2.206682E−02 | −1.082160E−01 | 8.507221E−03 | −5.707787E−03 |
| A12 | 2.712696E−02 | −4.325189E−03 | 4.575004E−03 | 6.298056E−02 | −2.670129E−03 | 1.591461E−03 |
| A14 | −3.547281E−02 | 6.399747E−03 | −7.462831E−04 | −2.154870E−02 | 5.335211E−04 | −2.871504E−04 |
| A16 | 1.994215E−02 | −2.245814E−03 | 1.090543E−04 | 4.182209E−03 | −7.196229E−05 | 3.236807E−05 |
| A18 | −4.068833E−03 | 2.541340E−04 | −7.989216E−06 | −4.282996E−04 | 6.926197E−06 | −2.068651E−06 |
| A20 | 0.000000E+00 | 0.000000E+00 | 1.000000E−08 | 1.802433E−05 | −3.559254E−07 | 5.727447E−08 |

The imaging lens in Example 10 satisfies conditional expressions (1) to (14) as shown in Table 11.

Figure 20:
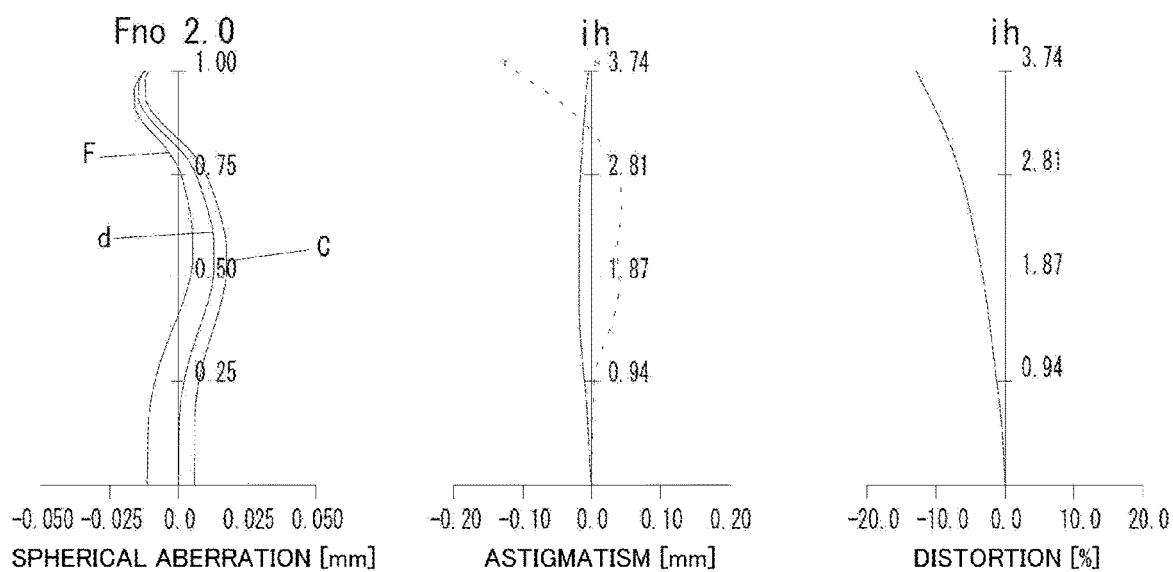
FIG. 20 shows spherical aberration, astigmatism, and distortion of the imaging lens in Example 10 according to the present invention.

FIG. 20 shows spherical aberration (mm), astigmatism (mm), and distortion (%) of the imaging lens in Example 10.

As shown in FIG. 20, each aberration is corrected excellently.

In table 11, values of conditional expressions (1) to (14) related to the Examples 1 to 10 are shown.

TABLE 11

| Conditional Expression | Example 1 | Example 2 | Example 3 | Example 4 | Example 5 |
|---|---|---|---|---|---|
| (1) $(N1 − 1)/(r1 \times f) \times 1000$ | 1.95E−08 | 1.94E−08 | 1.94E−09 | 1.94E−08 | 1.95E−08 |
| (2) $vd1/(vd2 + vd3)$ | 0.73 | 0.73 | 0.73 | 0.73 | 0.50 |
| (3) $vd5/vd6$ | 2.73 | 2.73 | 2.73 | 2.73 | 2.73 |
| (4) $f1/f$ | −10.22 | −9.58 | −6.38 | −9.96 | −12.01 |
| (5) $|f2|/f$ | 12.36 | 11.67 | 11.60 | 10.84 | 47.15 |
| (6) $f12/f$ | −5.44 | −5.11 | −3.98 | −5.05 | −15.66 |
| (7) $f3/f$ | 1.11 | 1.09 | 1.09 | 1.10 | 1.09 |
| (8) $|f4|/f$ | 5.01 | 5.59 | 5.25 | 5.41 | 3.98 |
| (9) $f5/f$ | 0.75 | 0.76 | 0.77 | 0.74 | 0.73 |
| (10) $f6/f$ | −0.88 | −0.88 | −0.94 | −0.86 | −0.77 |

TABLE 11-continued

| | | | | | |
|---|---|---|---|---|---|
| (11) r12/f | 0.28 | 0.28 | 0.29 | 0.28 | 0.26 |
| (12) Fno | 2.00 | 2.00 | 2.00 | 2.00 | 2.00 |
| (13) (D2/TTL) × 100 | 4.73 | 4.73 | 4.54 | 4.73 | 4.98 |
| (14) (T5/TTL) × 100 | 0.51 | 0.59 | 0.75 | 0.84 | 0.36 |

| Conditional Expression | Example 6 | Example 7 | Example 8 | Example 9 | Example 10 |
|---|---|---|---|---|---|
| (1) (N1 − 1)/(r1 × f) × 1000 | 1.93E−08 | 0.22 | −0.20 | 0.56 | −0.56 |
| (2) vd1/(vd2 + vd3) | 0.73 | 0.73 | 0.73 | 0.73 | 0.73 |
| (3) vd5/vd6 | 2.73 | 2.74 | 2.73 | 2.73 | 2.73 |
| (4) f1/f | −3.53 | −3.60 | −10.67 | −10.26 | −10.52 |
| (5) |f2|/f | 5.80 | 3.74 | 132.74 | 11.92 | 46.71 |
| (6) f12/f | −2.09 | −1.76 | −9.56 | −5.36 | −8.32 |
| (7) f3/f | 1.04 | 1.01 | 1.24 | 1.11 | 1.20 |
| (8) |f4|/f | 32.01 | 28.06 | 6.16 | 5.05 | 5.97 |
| (9) f5/f | 0.74 | 0.77 | 0.78 | 0.75 | 0.78 |
| (10) f6/f | −0.86 | −0.92 | −0.90 | −0.89 | −0.90 |
| (11) r12/f | 0.29 | 0.32 | 0.29 | 0.28 | 0.29 |
| (12) Fno | 2.00 | 2.00 | 2.00 | 2.00 | 2.00 |
| (13) (D2/TTL) × 100 | 5.17 | 4.42 | 5.09 | 4.83 | 5.06 |
| (14) (T5/TTL) × 100 | 0.26 | 0.35 | 0.35 | 0.44 | 0.35 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop,
L1: first lens,
L2: second lens,
L3: third lens,
L4: fourth lens,
L5: fifth lens,
L6: sixth lens,
ih: maximum image height,
IR: filter, and
IMG: image plane.

What is claimed is:

1. An imaging lens comprising, in order from an object side to an image side,
a first lens being a double-sided aspheric lens having negative refractive power,
a second lens having a concave surface facing the image side near an optical axis,
a third lens having positive refractive power,
a fourth lens,
a fifth lens, and
a sixth lens being a double-sided aspheric lens and having negative refractive power and a concave surface facing the image side near the optical axis, wherein an image-side surface of said sixth lens is an aspheric surface changing to the convex surface at a peripheral area, and a below conditional expressions (7), (8a), and (11) are satisfied:

$$0.5 < f3/f < 1.9 \tag{7}$$

$$3.0 < |f4|/f \tag{8a}$$

$$0.1 < r12/f < 0.5 \tag{11}$$

where
f3: focal length of the third lens,
f4: focal length of the fourth lens,
r12: paraxial curvature radius of the image-side surface of the sixth lens, and
f: focal length of an overall optical system.

2. The imaging lens according to claim 1, wherein an image-side surface of said first lens is the concave surface facing the image side near the optical axis.

3. The imaging lens according to claim 1, wherein an image-side surface of said third lens is the convex surface facing the image side near the optical axis.

4. The imaging lens according to claim 1, wherein said fourth lens is a meniscus lens having the convex surface facing the object side near the optical axis.

5. The imaging lens according to claim 1, wherein said fifth lens has the positive refractive power.

6. The imaging lens according to claim 1, wherein said fifth lens is a meniscus lens having the concave surface facing the object side near the optical axis.

7. The imaging lens according to claim 1, wherein an object-side surface of said sixth lens is the convex surface facing the object side near the optical axis, is an aspheric surface having an off-axial pole point.

8. The imaging lens according to claim 1, wherein a below conditional expression (2) is satisfied:

$$0.25 < vd1/(vd2+vd3) < 1.10 \tag{2}$$

where
vd1: abbe number at d-ray of a first lens,
vd2: abbe number at d-ray of a second lens, and
vd3: abbe number at d-ray of a third lens.

9. The imaging lens according to claim 1, wherein a below conditional expression (3) is satisfied:

$$1.3 < vd5/vd6 < 4.1 \tag{3}$$

where
vd5: abbe number at d-ray of a fifth lens, and
vd6: abbe number at d-ray of a sixth lens.

10. The imaging lens according to claim 1, wherein a below conditional expression (4) is satisfied:

$$-18 < f1/f < -2 \tag{4}$$

where
f1: focal length of the first lens, and
f: focal length of the overall optical system.

11. The imaging lens according to claim 1, wherein a below conditional expression (5) is satisfied:

$$1.8 < |f2|/f \tag{5}$$

where
f2: focal length of the second lens, and
f: focal length of the overall optical system.

12. The imaging lens according to claim 1, wherein a below conditional expression (6) is satisfied:

$$-24.0 < f12/f < -0.8 \tag{6}$$

where
f12: composite focal length of the first lens and the second lens, and
f: focal length of the overall optical system of the imaging lens.

13. The imaging lens according to claim 1, wherein a below conditional expression (9) is satisfied:

$$0.35 < f5/f < 1.20 \tag{9}$$

where
f5: focal length of the fifth lens, and
f: focal length of the overall optical system.

14. The imaging lens according to claim 1, wherein a below conditional expression (10) is satisfied:

$$-1.45 < f6/f < -0.35 \tag{10}$$

where
f6: focal length of the sixth lens, and
f: focal length of the overall optical system.

15. The imaging lens according to claim 1, wherein a below conditional expression (12) is satisfied:

$$Fno \leq 2.4 \tag{12}$$

where
Fno: F-number.

* * * * *